United States Patent
Sasaki

(10) Patent No.: US 12,447,945 B2
(45) Date of Patent: Oct. 21, 2025

(54) VEHICLE CONTROL DEVICE, VEHICLE CONTROL METHOD, AND NON-TRANSITORY STORAGE MEDIUM

(71) Applicant: TOYOTA JIDOSHA KABUSHIKI KAISHA, Aichi-ken (JP)

(72) Inventor: Hirotaka Sasaki, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 132 days.

(21) Appl. No.: 18/505,112

(22) Filed: Nov. 9, 2023

(65) Prior Publication Data

US 2024/0208484 A1    Jun. 27, 2024

(30) Foreign Application Priority Data

Dec. 21, 2022   (JP) .................. 2022-204738

(51) Int. Cl.
*B60W 20/12*   (2016.01)
*B60W 10/26*   (2006.01)
*B60W 20/13*   (2016.01)

(52) U.S. Cl.
CPC ............ *B60W 20/13* (2016.01); *B60W 10/26* (2013.01); *B60W 20/12* (2016.01); *B60W 2510/244* (2013.01)

(58) Field of Classification Search
CPC ...... B60W 20/13; B60W 10/26; B60W 20/12; B60W 2510/244; B60L 58/13
USPC .......................................................... 701/22
See application file for complete search history.

(56) References Cited

U.S. PATENT DOCUMENTS

| | | | | |
|---|---|---|---|---|
| 2010/0044131 | A1* | 2/2010 | Teraya ................. | B60W 10/26 180/65.265 |
| 2015/0224889 | A1* | 8/2015 | Ono ..................... | B60W 20/00 903/903 |
| 2019/0168735 | A1* | 6/2019 | Morisaki ............... | B60W 20/12 |
| 2023/0058534 | A1* | 2/2023 | Mizui .................. | B60W 10/08 |
| 2023/0062344 | A1 | 3/2023 | Sasaki | |

FOREIGN PATENT DOCUMENTS

| | | |
|---|---|---|
| JP | 2019-055607 A | 4/2019 |
| JP | 2023-035242 A | 3/2023 |

OTHER PUBLICATIONS

Kunihiko Jinno et al., "Hybrid Vehicle's Real World Fuel Economy Development by Machine Learning of Behavior Pattern", Transactions of Society of Automotive Engineers of Japan, vol. 49, No. 2, Mar. 2018, 4pp.

* cited by examiner

*Primary Examiner* — B M M Hannan
(74) *Attorney, Agent, or Firm* — HAUPTMAN HAM, LLP

(57) ABSTRACT

A processor is capable of executing low SOC control to set a particular target SOC, which is a target SOC for when a vehicle traveling from a first specific position along a first journey route arrives at a second specific position, to a value lower than the normal target SOC. The particular target SOC of the vehicle executing the low SOC control is a value of the EV-SW permissible SOC or greater in cases in which a prohibition frequency is a first threshold or greater, with the prohibition frequency being derived based on a total value of prohibition points representing the vehicle being prohibited from entering the EV priority mode due to the low SOC control.

9 Claims, 15 Drawing Sheets

| ROUTE | HOLIDAY/WEEKDAY | TIME BAND | NUMBER OF TIMES PROHIBITED | NUMBER OF TIMES PERMITTED | PROHIBITION FREQUENCY |
|---|---|---|---|---|---|
| PARTICULAR JOURNEY SEGMENT RS-A | WEEKDAY | 0-5 | 0 | 0 | 0% |
| | | 5-11 | 4 | 46 | 8% |
| | | 11-14 | 0 | 2 | 0% |
| | | 14-20 | 0 | 0 | 0% |
| | | 20-24 | 0 | 0 | 0% |
| | HOLIDAY | 0-5 | 0 | 0 | 0% |
| | | 5-11 | 0 | 2 | 0% |
| | | 11-14 | 0 | 2 | 0% |
| | | 14-20 | 0 | 0 | 0% |
| | | 20-24 | 0 | 0 | 0% |

| ROUTE | HOLIDAY/ WEEKDAY | TIME BAND | NUMBER OF TIMES PROHIBITED | NUMBER OF TIMES PERMITTED | PROHIBITION FREQUENCY |
|---|---|---|---|---|---|
| PARTICULAR JOURNEY SEGMENT RS-C | WEEKDAY | 0-5 | 0 | 0 | 0% |
| | | 5-11 | 2 | 8 | 10% |
| | | 11-14 | 3 | 27 | 10% |
| | | 14-20 | 1 | 9 | 10% |
| | | 20-24 | 0 | 0 | 0% |
| | HOLIDAY | 0-5 | 0 | 0 | 0% |
| | | 5-11 | 0 | 5 | 0% |
| | | 11-14 | 0 | 7 | 0% |
| | | 14-20 | 4 | 46 | 8% |
| | | 20-24 | 0 | 0 | 0% |

MP2

| ROUTE | HOLIDAY/WEEKDAY | TIME BAND | NUMBER OF TIMES PROHIBITED | NUMBER OF TIMES PERMITTED | PROHIBITION FREQUENCY |
|---|---|---|---|---|---|
| PARTICULAR JOURNEY SEGMENT RS-E | WEEKDAY | 0-5 | 0 | 0 | 0% |
| | | 5-11 | 0 | 0 | 0% |
| | | 11-14 | 0 | 2 | 0% |
| | | 14-20 | 0 | 0 | 0% |
| | | 20-24 | 0 | 0 | 0% |
| | HOLIDAY | 0-5 | 4 | 46 | 8% |
| | | 5-11 | 0 | 5 | 0% |
| | | 11-14 | 3 | 27 | 10% |
| | | 14-20 | 0 | 0 | 0% |
| | | 20-24 | 0 | 0 | 0% |

MP3

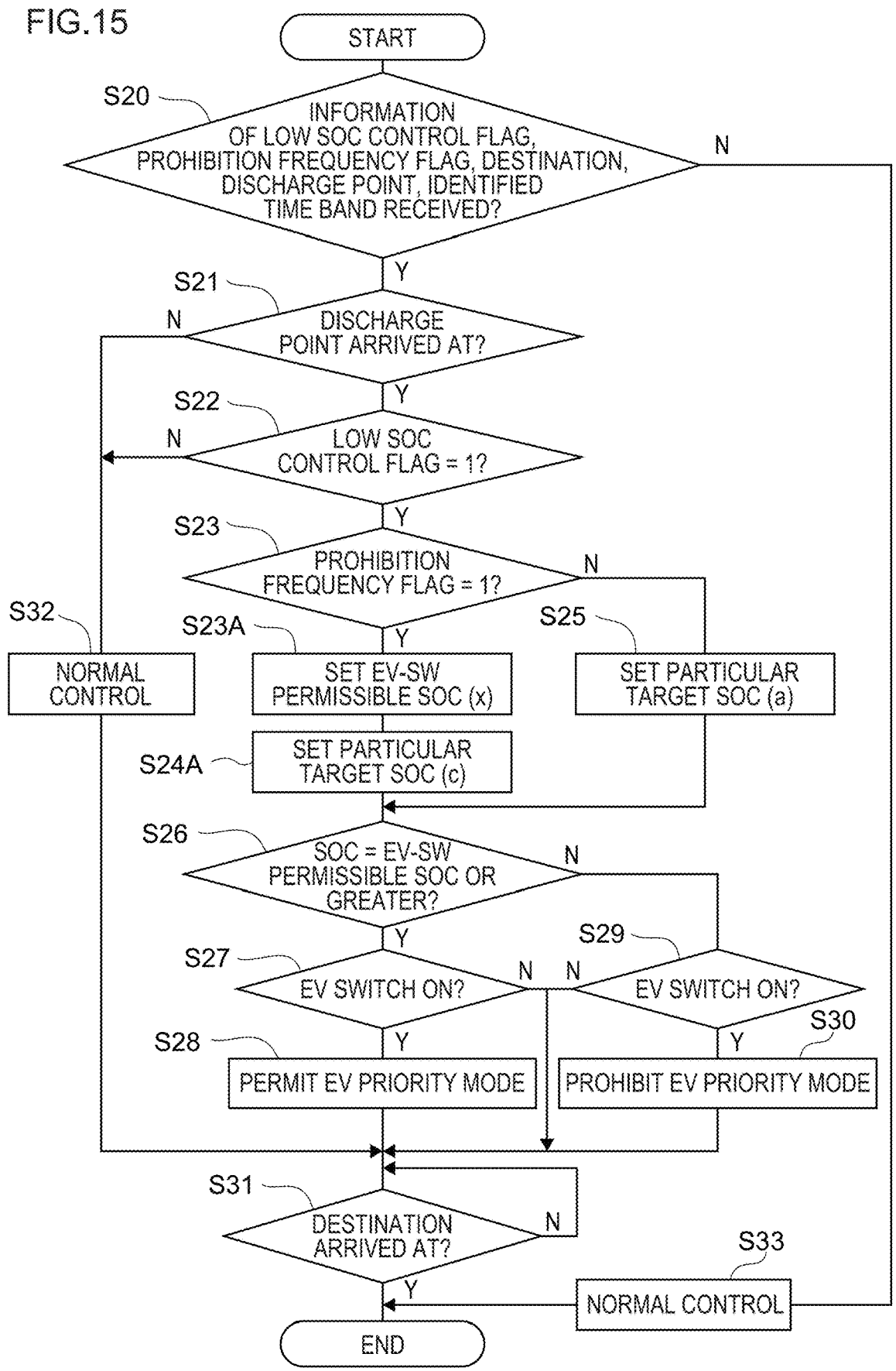

VEHICLE CONTROL DEVICE, VEHICLE CONTROL METHOD, AND NON-TRANSITORY STORAGE MEDIUM

CROSS-REFERENCE TO RELATED APPLICATION

This application is based on and claims priority under 35 USC 119 from Japanese Patent Application No. 2022-204738 filed on Dec. 21, 2022, the disclosure of which is incorporated by reference herein.

BACKGROUND

Technical Field

The present disclosure relates to a vehicle control device, a vehicle control method, and a non-transitory storage medium.

Related Art

Japanese Patent Application Laid-Open (JP-A) No. 2019-055607 discloses a hybrid vehicle (hereafter referred to as vehicle) capable of executing low state of charge (SOC) control to lower the SOC of the vehicle from a normal value when a specific condition has been satisfied. This vehicle ascertains whether forced charging control was executed and at what frequency when the vehicle travelled from a specific position to a destination in the past based on vehicle journey history. Forced charging control is control in which an internal combustion engine is forcibly actuated in order to raise the SOC of a battery.

In cases in which it has been determined that a frequency of forced charging control execution is low, low SOC control is executed when the vehicle is travelling between the specific position and the destination. When low SOC control is executed, the vehicle fuel economy is improved due to the SOC being a low value when arriving at the destination. However, in cases in which it has been determined that the frequency of forced charging control execution is high, then low SOC control is not executed when the vehicle is travelling between the specific position and the destination.

A vehicle is known that is able to travel in an EV priority mode when an EV switch is switched ON. The EV priority mode is a travel mode in which an electric motor is prioritized to be employed as a drive source. The vehicle travels in the EV priority mode when the EV switch is switched ON when the SOC is a specific value or greater. The technology of JP-A No. 2019-055607 is applicable to such a vehicle. However in such a vehicle, the SOC would likely be a low value when low SOC control is being executed, meaning that a state is likely to arise in which travel in EV priority mode is not possible.

In consideration of the above circumstances, an object of the present disclosure is to obtain a vehicle control device, a vehicle control method, and a non-transitory storage medium that make it unlikely that travel in EV priority mode will be impeded in a vehicle capable of executing low SOC control.

SUMMARY

A vehicle control device of a first aspect includes a processor. The processor is configured to cause a vehicle to enter an EV priority mode in which an electric motor of a vehicle is prioritized for use as a drive source of the vehicle and an internal combustion engine is not used, when a state of charge (SOC) of a battery configured to supply electrical power to the electric motor is not less than an EV-SW permissible SOC that is lower than a normal target SOC and an EV switch has been switched ON, to prohibit the vehicle from entering the EV priority mode in a case in which the SOC is less than the EV-SW permissible SOC, and to execute low SOC control to set a particular target SOC, which is a target SOC for when the vehicle, which is traveling from a first specific position along a first journey route, arrives at a second specific position, to a value lower than the normal target SOC. The particular target SOC of the vehicle executing the low SOC control is equal to or greater than a value of the EV-SW permissible SOC in a case in which a prohibition frequency is a first threshold or greater. The prohibition frequency is derived based on a total value of prohibition points that represent the vehicle being prohibited from entering the EV priority mode as a result of the low SOC control.

The processor of the vehicle control device of the first aspect is configured to cause a vehicle to enter an EV priority mode in which the electric motor is prioritized for use as the drive source of the vehicle when the SOC that is the state of charge of the battery is not less than the EV-SW permissible SOC lower than the normal target SOC of the battery and also the EV switch provided to the vehicle has been switched ON. However, the processor of the vehicle control device is configured to prohibit the vehicle from entering the EV priority mode in cases in which the SOC is less than the EV-SW permissible SOC. Furthermore, the vehicle control device is configured to execute the low SOC control to set the particular target SOC, which is the target SOC for when the vehicle, which is traveling from a first specific position along the first journey route arrives at the second specific position, to a value lower than the normal target SOC. Furthermore, the particular target SOC of the vehicle executing the low SOC control is equal to or greater than a value of the EV-SW permissible SOC in a case in which a prohibition frequency is a first threshold or greater. The prohibition frequency is derived based on a total value of prohibition points that represent the vehicle is prohibited from entering the EV priority mode as a result of the low SOC control.

Consider a case in which the prohibition frequency when the vehicle travelled in the past between the first specific position and the second specific position with the particular target SOC in a state lower than the EV-SW permissible SOC is the first threshold or greater. In such cases, when the vehicle subsequently travels between the first specific position and the second specific position in a state in which the particular target SOC is lower than the EV-SW permissible SOC, the prohibition frequency of the vehicle being prohibited from entering the EV priority mode is likely to be the first threshold or greater. Thus in such cases at least one of the particular target SOC or the EV-SW permissible SOC is changed such that the particular target SOC is a value of the EV-SW permissible SOC or greater. In such cases, the vehicle is unlikely to be prohibited from entering the EV priority mode even when the vehicle is travels between the first specific position and the second specific position while executing the low SOC control. Namely, the vehicle capable of executing low SOC control is unlikely to be impeded from traveling in the EV priority mode.

Furthermore, consider a case in which the prohibition frequency has been determined to be less than the first threshold when the vehicle travelled in the past between the first specific position and the second specific position with the particular target SOC in a state lower than the EV-SW permissible SOC. In such cases, the prohibition frequency is likely to be less than the first threshold when the vehicle subsequently travels between the first specific position and the second specific position in a state in which the particular target SOC is lower than the EV-SW permissible SOC. This means that while executing the low SOC control, the vehicle is unlikely to be prohibited from entering the EV priority mode even when the vehicle travels between the first specific position and the second specific position in a state in which the particular target SOC is lower than the EV-SW permissible SOC.

By the way, the more accurately the prohibition frequency derived as described above represents the correlation between execution of low SOC control and the vehicle being prohibited from entering the EV priority mode, the more unlikely the vehicle is to be impeded from traveling in the EV priority mode.

The prohibition points of the vehicle control device of the first aspect each represent an instance in which the vehicle was prohibited from entering the EV priority mode due to the SOC control. This means that the prohibition frequency derived by the vehicle control device of the first aspect accurately represents the correlation between execution of low SOC control and the vehicle being prohibited from entering the EV priority mode. The first aspect is accordingly able to make it unlikely that the vehicle capable of executing low SOC control is impeded from travel in EV priority mode.

A vehicle control device according to a second aspect is the first aspect, wherein the processor is configured to add a point to the prohibition points related to the first journey route in cases in which in the vehicle travelling the first journey route the low SOC control is being executed and entering the EV priority mode has been prohibited, and in a case in which the vehicle is traveling on a second journey route starting from the second specific position without executing low SOC control after the vehicle has travelled the first journey route while the low SOC control was being executed, prohibit the vehicle traveling on the second journey route from entering the EV priority mode and add a point to the prohibition points related to the first journey route when a particular condition has been satisfied.

In the second aspect, a prohibition point related to the first journey route is added in cases in which while the vehicle is traveling the first journey route the low SOC control is executed and also entering the EV priority mode was prohibited. Furthermore, a prohibition point related to the first journey route is also added when the vehicle traveling the second journey route is prohibited from entering the EV priority mode and the particular condition is satisfied in cases in which the vehicle is traveling the second journey route starting from the second specific position without low SOC control being executed after the vehicle travelled the first journey route while low SOC control was being executed. This means that the prohibition frequency derived by the vehicle control device of the second aspect accurately represents the correlation between execution of low SOC control and the vehicle being prohibited from entering the EV priority mode. This means that the second aspect enables impeding of the vehicle capable of executing low SOC control from traveling in the EV priority mode to be made unlikely.

A vehicle control device according to a third aspect is the second aspect, wherein, in a case in which the low SOC control continues until the vehicle arrived at the second specific position, the particular condition is satisfied when a period of time is a second threshold or lower. The period of time is from a time at which the vehicle departed from the second specific position of the first journey route to a time at which the vehicle traveling on the second journey route was prohibited from entering the EV priority mode.

In the third aspect, in a case in which the low SOC control continues until the vehicle arrived at the second specific position, the particular condition is satisfied when a period of time is a second threshold or lower. The period of time is from a time at which the vehicle departed from the second specific position of the first journey route to a time at which the vehicle traveling on the second journey route was prohibited from entering the EV priority mode. There is conceivably a low correlation between execution of low SOC control and the vehicle being prohibited from entering the EV priority mode when the second time is arrived at after elapse of a given length of time from when the low SOC control ended. This means that the vehicle control device of the third aspect is able to prevent a prohibition point having a small correlation to execution of low SOC control being added. The third aspect accordingly makes it unlikely that the vehicle capable of executing low SOC control is impeded from traveling in the EV priority mode.

A vehicle control device according to a fourth aspect is the second aspect, wherein, in a case in which the low SOC control ends prior to the vehicle arriving at the second specific position, the particular condition is satisfied when a period of time is a second threshold or lower. The period of time is from a time at which the low SOC control ended to a time at which the vehicle was prohibited from entering EV priority mode while traveling in a region between a position of the vehicle when the low SOC control ended and the second specific position.

In the fourth aspect, in a case in which the low SOC control ends prior to the vehicle arriving at the second specific position, the particular condition is satisfied when a period of time is a second threshold or lower. The period of time is from a time at which the low SOC control ended to a time at which the vehicle was prohibited from entering EV priority mode while traveling in a region between a position of the vehicle when the low SOC control ended and the second specific position. The vehicle control device of the fourth aspect is accordingly able to prevent a prohibition point with a small correlation to execution of low SOC control from being added in cases in which low SOC control ended prior to the vehicle arriving at the second specific position and the vehicle subsequently travels to the second specific position. The fourth aspect accordingly makes it unlikely that the vehicle capable of executing low SOC control is impeded from travel in EV priority mode.

A vehicle control device according to a fifth aspect is the second aspect, wherein, in a case in which the low SOC control ends prior to the vehicle arriving at the second specific position, the particular condition is satisfied when a journey elapse time is a second threshold or lower. The journey elapse time is a value calculated by taking a period of time from a first time at which the low SOC control ended to a second time at which the vehicle traveling in a specific region of the second journey route was prohibited from entering the EV priority mode, and subtracting, from the period of time, a time during which the vehicle was parked between the first time and the second time.

In the fifth aspect, in a case in which the low SOC control ends prior to the vehicle arriving at the second specific position, the particular condition is satisfied when a journey elapse time is a second threshold or lower. The journey elapse time is a value calculated by taking a period of time from a first time at which the low SOC control ended to a second time at which the vehicle traveling in a specific region of the second journey route was prohibited from entering the EV priority mode, and subtracting, from the period of time, a time during which the vehicle was parked between the first time and the second time. The fifth aspect accordingly makes it unlikely that the vehicle capable of executing low SOC control is impeded from traveling in the EV priority mode.

A vehicle control device according to a sixth aspect is the second aspect, wherein the particular condition is satisfied when a distance is a third threshold or lower. The distance is from a position of the vehicle when the low SOC control ended to a position of the vehicle when the vehicle traveling on the second journey route was prohibited from entering the EV priority mode.

In the sixth aspect, the particular condition is satisfied when a distance is a third threshold or lower. The distance is from a position of the vehicle when the low SOC control ended to a position of the vehicle when the vehicle traveling on the second journey route was prohibited from entering the EV priority mode. There is conceivably a low correlation between execution of low SOC control and the vehicle being prohibited from entering the EV priority mode when the vehicle has travelled a given distance from where the low SOC control ended. The vehicle control device of the sixth aspect accordingly enables a prohibition point with a small correlation to execution of low SOC control to be prevented from being added. The sixth aspect accordingly makes it unlikely that the vehicle capable of executing low SOC control is impeded from traveling in the EV priority mode.

A vehicle control device according to a seventh aspect is the second aspect, wherein the particular condition is satisfied when the vehicle traveling on the second journey route has been prohibited from entering the EV priority mode after the low SOC control has ended and prior to the SOC of the battery of the vehicle traveling on the second journey route reaching a magnitude of a specific fourth threshold or greater.

In the seventh aspect the particular condition is satisfied when the vehicle traveling on the second journey route has been prohibited from entering the EV priority mode after the low SOC control has ended and prior to the SOC of the battery of the vehicle traveling on the second journey route reaching the magnitude of the specific fourth threshold or greater. There is conceivably a low correlation between execution of low SOC control and the vehicle being prohibited from entering the EV priority mode after passage of a time when the SOC of the battery of the vehicle traveling on the second journey route has reached the fourth threshold or greater. The vehicle control device of the seventh aspect is accordingly able to prevent a prohibition point with a small correlation to execution of low SOC control from being added. The seventh aspect accordingly makes it unlikely that the vehicle capable of executing low SOC control is impeded from traveling in the EV priority mode.

A vehicle control method according to an eight aspect includes, by a processor, causing a vehicle to enter an EV priority mode in which an electric motor of a vehicle is prioritized for use as a drive source of the vehicle and an internal combustion engine is not used, when an SOC of a battery configured to supply electrical power to the electric motor is not less than an EV-SW permissible SOC that is lower than a normal target SOC and an EV switch has been switched ON; prohibiting the vehicle from entering the EV priority mode in a case in which the SOC is less than the EV-SW permissible SOC; and executing low SOC control to set a particular target SOC, which is a target SOC for when the vehicle, which is traveling from a first specific position along a first journey route, arrives at a second specific position, to a value lower than the normal target SOC. The particular target SOC of the vehicle executing the low SOC control is equal to or greater than a value of the EV-SW permissible SOC in a case in which a prohibition frequency is a first threshold or greater, the prohibition frequency being derived based on a total value of prohibition points that represent the vehicle being prohibited from entering the EV priority mode as a result of the low SOC control.

A non-transitory storage medium of a ninth aspect is a non-transitory storage medium storing a program executable by a computer to perform processing, the processing. The processing includes causing a vehicle to enter an EV priority mode in which an electric motor of a vehicle is prioritized for use as a drive source of the vehicle and an internal combustion engine is not used, when an SOC of a battery configured to supply electrical power to the electric motor is not less than an EV-SW permissible SOC that is lower than a normal target SOC and an EV switch has been switched ON; prohibiting the vehicle from entering the EV priority mode in a case in which the SOC is less than the EV-SW permissible SOC; and executing low SOC control to set a particular target SOC, which is a target SOC for when the vehicle, which is traveling from a first specific position along a first journey route, arrives at a second specific position, to a value lower than the normal target SOC. The particular target SOC of the vehicle executing the low SOC control is equal to or greater than a value of the EV-SW permissible SOC in a case in which a prohibition frequency is a first threshold or greater, the prohibition frequency being derived based on a total value of prohibition points that represent the vehicle being prohibited from entering the EV priority mode as a result of the low SOC control.

As described above, the vehicle control device, the vehicle control method, and the non-transitory storage medium according to the present disclosure exhibit the excellent advantageous effect of making it unlikely that a vehicle capable of executing low SOC control is impeded from travel in EV priority mode.

BRIEF DESCRIPTION OF THE DRAWINGS

Exemplary embodiments of the present disclosure will be described in detail based on the following figures, wherein:

FIG. 15 is a flowchart illustrating processing executed by an ECU of the fourth exemplary embodiment.

DETAILED DESCRIPTION

Description follows regarding a first exemplary embodiment of a vehicle control device 10, a vehicle control method, and a non-transitory storage medium according to the present disclosure, with reference to FIG. 1 to FIG. 13.

Figure 1:
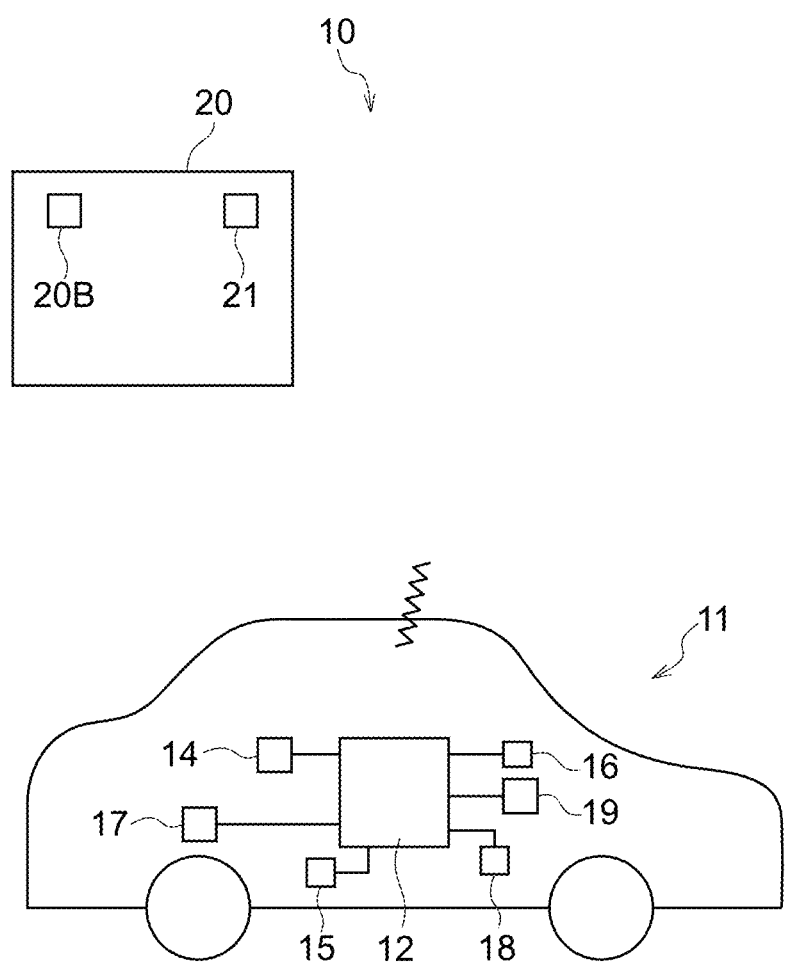
FIG. 1 is a diagram illustrating a vehicle control device according to a first exemplary embodiment and a vehicle controlled by the vehicle control device.

As illustrated in FIG. 1, the vehicle control device 10 controls a vehicle 11, and includes various devices installed to the vehicle 11 and an external server 20. An ID representing the vehicle 11 is appended to the vehicle 11.

The vehicle 11 includes an electronic control unit (ECU) 12, a global navigation satellite system (GNSS) receiver 14, an internal combustion engine 15, an electric motor 16, a battery 17, an EV switch 18, and a display 19. The GNSS receiver 14, the internal combustion engine 15, the electric motor 16, the battery 17, the EV switch 18, and the display 19 are connected to the ECU 12.

The internal combustion engine 15 and the electric motor 16 are connected to drive wheels (omitted in the drawings) through a drive transmission (omitted in the drawings). Namely, the vehicle 11 is a hybrid vehicle (hybrid electric vehicle) including the internal combustion engine 15 and the electric motor 16 as drive sources. This means that travel modes of the vehicle 11 include both an EV priority mode (also called an EV mode) in which the electric motor 16 is prioritized for use as the drive source, and a HV mode in which both the internal combustion engine 15 and the electric motor 16 are used as the drive source.

The internal combustion engine 15 operates by combusting gasoline, for example. The electric motor 16 operates by being supplied with electrical power from the battery 17. The electric motor 16 also functions as a generator. For example, the electric motor 16 is able to function as a generator when the internal combustion engine 15 is operating as the drive source. Note that although omitted in the drawings, the electric motor 16 of the present exemplary embodiment includes two electric motors. These two electric motors are both able to function as an electric motor (drive source) and a generator. The electrical power generated by the electric motor 16 is stored in the battery 17.

Figure 9:
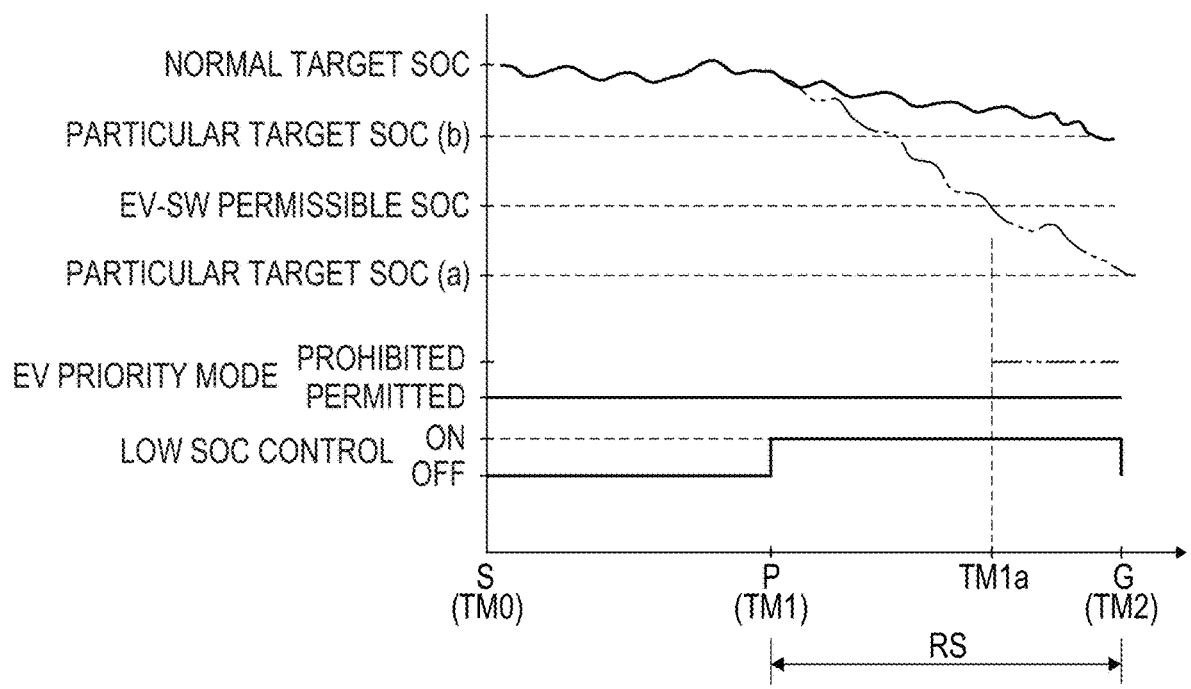
FIG. 9 is a timing chart illustrating respective states of SOC, EV priority mode, and low SOC control when vehicle has travelled in a particular journey segment.

The battery 17 is, for example, a nickel hydride secondary battery or a lithium ion secondary battery. When the ignition switch of the vehicle 11 is in the ON position, the ECU 12 (drive source control section 122) selects at least one out of the internal combustion engine 15 or the electric motor 16 as the drive source such that a magnitude of the state of charge (SOC) of the battery 17 approaches a specific target SOC. The meaning of target SOC encompasses both a normal target SOC and a particular target SOC. The particular target SOC is a target SOC for when the ECU 12 is executing low SOC control, described later. More specifically, the particular target SOC is a target SOC for when the vehicle 11 has arrived at destination G, described later. The particular target SOC of the present exemplary embodiment includes both a particular target SOC (a) and a particular target SOC (b), described later. The normal target SOC is a target SOC for when the ECU 12 is executing normal control. In other words, the normal target SOC is a target SOC for when the ECU 12 is not executing the low SOC control. Magnitude relationships between these are illustrated in FIG. 9. Namely, normal target SOC>particular target SOC (b)>particular target SOC (a). For example, a value of the normal target SOC is 63%. For example, a value of the particular target SOC (a) is 42%, and the value of the particular target SOC (b) is 48%.

Note that reference in the present specification to "ignition switch 35" encompasses both an ignition switch operated by a key and other switches. Other switches include, for example, a push style start button.

The GNSS receiver 14 acquires location information (such as latitude and longitude) of the ground point where the vehicle 11 is traveling based on GNSS signals transmitted from satellites repeatedly acquired at a specific frequency.

The EV switch 18 and the display 19 are, for example, provided to an instrument panel (omitted in the drawings) of the vehicle 11. As described later, the travel mode of the vehicle 11 is switched to "EV priority mode" when the EV switch 18 has been moved by an occupant to the ON position under a specific condition. The EV priority mode is a travel mode in which torque generated by the internal combustion engine 15 is basically not transmitted to the drive wheels of the vehicle 11 and the vehicle 11 travels under drive force generated by the electric motor 16 alone.

Figure 2:
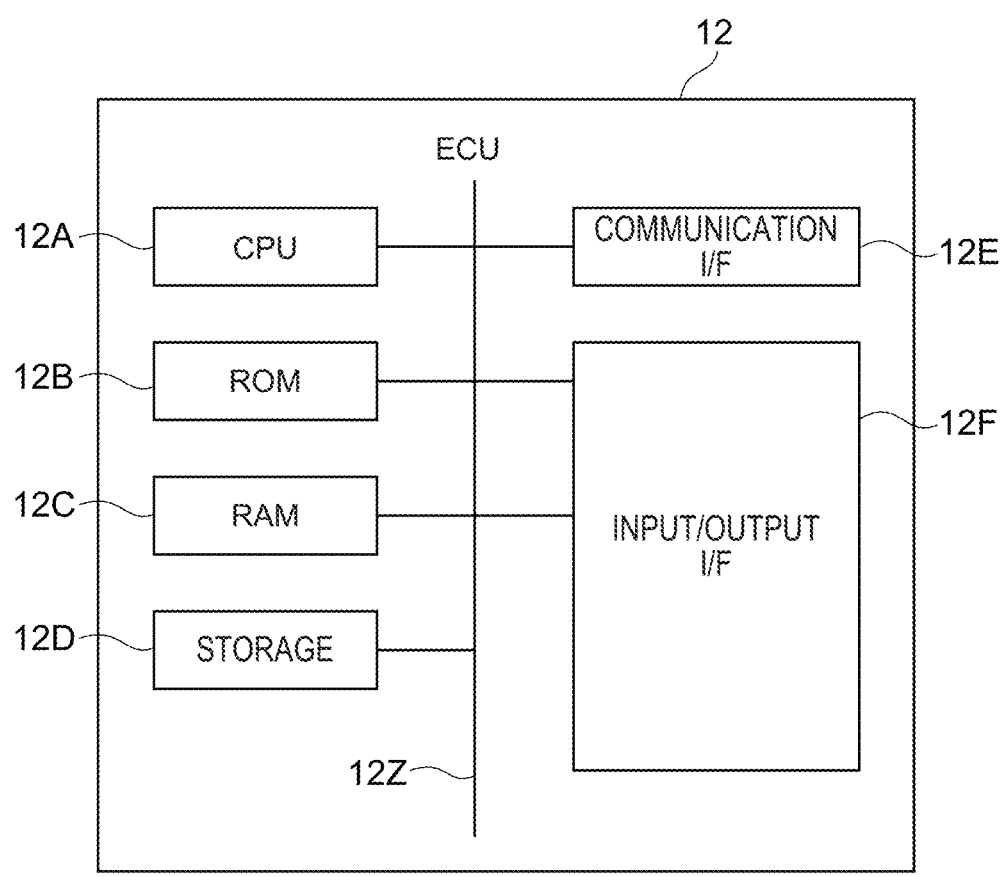
FIG. 2 is a control block diagram of an ECU of a vehicle.

The ECU 12 as illustrated in FIG. 2 is configured including a central processing unit (CPU) (processor) (computer) 12A, read only memory (ROM) (non-transitory storage medium) 12B, random access memory (RAM) 12C, storage (non-transitory storage medium) 12D, a communication interface (I/F) 12E, and an input/output I/F 12F. The CPU 12A, the ROM 12B, the RAM 12C, the storage 12D, the communication I/F 12E, and the input/output I/F 12F are connected together through a bus 12Z so as to be capable of communicating with each other. The ECU 12 is able to acquire information related to date and time from a timer (omitted in the drawings).

The CPU 12A is a central processing unit that executes various programs and controls each section. Namely, the CPU 12A reads a program from the ROM 12B or the storage 12D, and executes the program using the RAM 12C as a workspace. The CPU 12A performs control of each configuration and performs various computation processing according to the program recorded in the ROM 12B or the storage 12D.

The ROM 12B stores various programs and various data. The RAM 12C serves as a workspace to temporarily store programs and data. The storage 12D is configured by a storage device such as a hard disk drive (HDD) or an solid state drive (SSD), and is stored with various programs and various data. The communication I/F 12E is an interface for communication with other devices. For example, the communication I/F 12E is able to communicate wirelessly with a wireless communication device 21 of an external server 20. The input/output I/F 12F is an interface for communicating with various devices.

Figure 3:
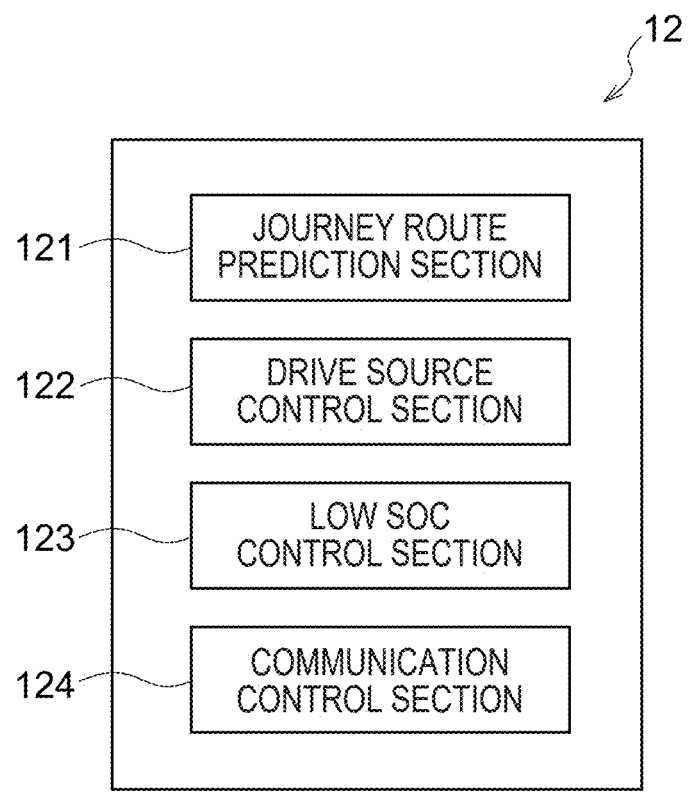
FIG. 3 is a functional block diagram of the ECU illustrated in FIG. 2.

FIG. 3 is a block diagram illustrating an example of a functional configuration of the ECU 12. The ECU 12 includes, as functional configuration, a journey route prediction section 121, a drive source control section 122, a low SOC control section 123, and a communication control section 124. The journey route prediction section 121, the drive source control section 122, the low SOC control section 123, and the communication control section 124 are realized by the CPU 12A reading and executing a program stored on the ROM 12B.

The journey route prediction section 121 predicts a journey route of the vehicle 11 based on information input to a car navigation system, speed information of the vehicle 11, steering angle information of the vehicle 11, operation information of direction indicators (turn signal levers) (omitted in the drawings), location information as received by the GNSS receiver 14, the current date and time, and journey history information of the vehicle 11 as recorded on the storage 12D. Note that each item of journey history included in the journey history information is associated with a data and time band in which the vehicle 11 was travelling.

The drive source control section 122 decides the travel mode of the vehicle 11 based on plural information, and selects at least one from out of the internal combustion engine 15 or the electric motor 16 as the drive source. This information includes at least a degree of acceleration of an acceleration pedal (omitted in the drawings), an SOC of the battery 17, the speed of the vehicle 11, and whether or not the EV switch 18 has been switched ON. Note that drive source control section 122 forcibly runs the internal combustion engine 15 when the SOC of the battery 17 becomes a magnitude equal to or less than forced charging SOC, which is a value lower than the particular target SOC (a).

The drive source control section 122 performs determination as to whether or not the travel mode of the vehicle 11 is set to the "EV priority mode". Namely, the drive source control section 122 sets the travel mode of the vehicle 11 to the "EV priority mode" when the SOC of the battery 17 is the EV-SW permissible SOC or above and the EV switch 18 is in the ON position. However, the drive source control section 122 does not set the travel mode of the vehicle 11 to the "EV priority mode" when the SOC of the battery 17 is less than the EV-SW permissible SOC. The magnitude relationships of the EV-SW permissible SOC, the normal target SOC, the particular target SOC (a), and the particular target SOC (b) of the present exemplary embodiment are as illustrated in FIG. 9. Namely, the magnitude relationship of these values is normal target SOC>particular target SOC (b)>EV-SW permissible SOC>particular target SOC (a). For example, the value of the EV-SW permissible SOC is 43%.

When a parking determination section 211 of the external server 20 has determined that the "vehicle will be in prolonged parking state" as described later, the low SOC control section 123 sets the target SOC of the battery 17 when the vehicle 11 is traveling in a particular journey segment RS described later to a particular target SOC that is a value lower than the normal target SOC. Namely, the vehicle 11 is controlled such that the SOC reaches the particular target SOC when the vehicle 11 has arrived at the destination G. The control in this manner so as to set the target SOC of the battery 17 when the vehicle 11 is traveling in the particular journey segment RS to the particular target SOC that is a value lower than the normal target SOC is called low SOC control. Note that as described later, the particular journey segment RS includes, for example, the particular journey segments RS-A, RS-B, RS-C, RS-E.

The communication control section 124 controls the communication I/F 12E.

The external server 20 includes, as a hardware configuration, a CPU, ROM 20B, RAM, storage, a communication I/F, and an input/output I/F. The CPU, the ROM 20B, the RAM, the storage, the communication I/F, and the input/output I/F are connected together through a bus so as to be capable of communicating with each other. The external server 20 is able to acquire information related to the date and time from a timer (omitted in the drawings).

The storage of the external server 20 is recorded with journey history information for plural vehicles including the vehicle 11, with this journey history information recorded associated with the IDs of each vehicle. The journey history information of each vehicle is wirelessly transmitted to the wireless communication device 21 of the external server 20 from the communication I/F 12E of each vehicle. This journey history information includes a journey route actually travelled by each vehicle and a place actually parked for each vehicle. Furthermore, the journey history information includes a date and time and number of times each vehicle has travelled on each journey route, as well as the date and time, the parking duration, and the number of times parked at each parking place. The journey history information further includes information related to a place (location information), number of times, and date and time the EV switch 18 was switched ON, as well as information related to a place (location information), number of times, and date and time when execution of EV priority mode was prohibited. Moreover, the storage of the external server 20 is recorded with information the external server 20 has received from the communication I/F 12E related to the journey route of each vehicle as predicted by the journey route prediction section 121.

Figure 4:
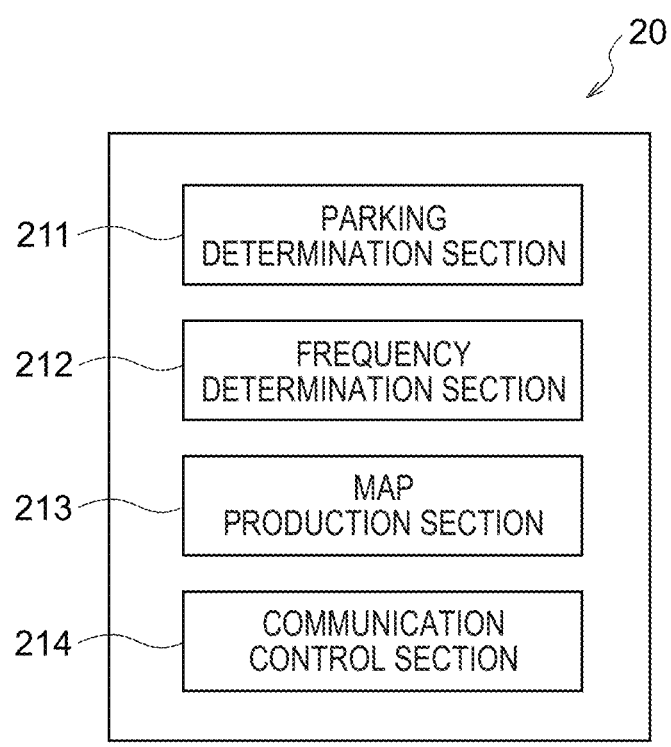
FIG. 4 is a functional block diagram of hardware of the external server illustrated in FIG. 1.

FIG. 4 illustrates a block diagram of an example of a functional configuration of hardware of the external server 20. The hardware of the external server 20 includes, as functional configuration, the parking determination section 211, a frequency determination section 212, a map production section 213, and a communication control section 214. The parking determination section 211, the frequency determination section 212, the map production section 213, and the communication control section 214 are realized by the CPU reading and executing a program stored on the ROM 20B.

The parking determination section 211 predicts a destination (end arrival point) G of the journey route of the vehicle 11 based on a predicted journey route, the current date and time, weather information, and journey history information recorded in the storage. Furthermore, the parking determination section 211 predicts a length of a parking duration of the vehicle 11 at the predicted destination G. Namely, the parking determination section 211 determines whether or not the length of the parking duration of the vehicle 11 at the destination G will be longer than a specific parking duration threshold. In the present specification, a parking state of the vehicle 11 having a duration longer than the parking duration threshold is called a prolonged parking state. A parking state of the vehicle 11 having a duration not longer than the parking duration threshold is called a short parking state. The parking duration threshold is, for example, 6 hours. The parking duration threshold is recorded in the ROM 20B of the external server 20. Note that methods are known for estimating a destination of the journey route of a vehicle and a parking state at the destination based on each information as described above. For example, the destination of the journey route of a vehicle and the parking state at the destination may be estimated using the method disclosed in Japanese Patent Application Laid-Open (JP-A) No. 2019-055607.

The frequency determination section 212 decides a discharge point P that is a specific position at a specific distance before the destination G on the estimated journey route. A segment on the journey route between the destination G and the discharge point P is the particular journey segment RS. Furthermore, based on information contained in the journey history information related to places and dates and times when execution of EV priority mode was prohibited, the frequency determination section 212 computes a prohibition frequency that is a frequency with which execution of EV priority mode was prohibited when the vehicle 11 travelled on the particular journey segment RS in the past. Prohibition of execution of EV priority mode includes when a transition to EV priority mode is rejected by the drive source control section 122 when the EV switch 18 in the OFF position was moved to the ON position, and also when the EV priority mode being executed is stopped by the drive source control section 122. Permitting execution of EV priority mode includes when the travel mode is transitioned to the EV priority mode by the drive source control section 122 when the EV switch 18 in the OFF position was moved to the ON position, and also includes when the EV priority mode being executed continues to be executed by the drive source control section 122.

The map production section 213 produces a map, described later, based on information related to journey history received from the vehicle 11 and also updates the map recorded in the ROM 20B.

Figure 6:
FIG. 6 is a diagram illustrating a map produced when a vehicle has travelled in a particular journey segment RS-A of journey routes RT1, RT2.
Figure 7:
FIG. 7 is a diagram illustrating a map produced when a vehicle has travelled in a particular journey segment RS-C of journey routes RT3, RT4.
Figure 8:
FIG. 8 is a diagram illustrating a map produced when a vehicle has travelled in a particular journey segment RS-E of journey routes RT6, RT7.

FIG. 6 to FIG. 8 illustrate examples of maps MP1, MP2, MP3 representing prohibition frequencies (journey histories) when execution of EV priority mode was prohibited when the vehicle 11 travelled in the particular journey segment RS and other segments in the past. More specifically, the maps MP1, MP2, MP3 represent the prohibition frequencies when execution of EV priority mode was prohibited when the vehicle 11 travelled in the particular journey segment RS while low SOC control was being executed to set the target SOC of the battery 17 to the particular target SOC (a). Note that in the present specification travel of the vehicle 11 from when the ignition switch was switched ON to when the ignition switch was switched OFF is called a trip. Moreover, in cases in which the vehicle 11 executes a new trip after the vehicle 11 has finished one trip then the initial trip is called a first trip and the next trip is called a second trip. The maps MP1, MP2, MP3 of FIG. 6 to FIG. 8 are recorded in the ROM 20B of the external server 20.

The map MP1 of FIG. 6 represents frequencies with which prohibition of EV priority mode was caused by low SOC control being executed in the particular journey segment RS-A, described later, for a case in which the vehicle 11 has travelled on the journey route RT1 (first journey route) and on the journey route RT2 (second journey route) illustrated in FIG. 5. In other words, the map MP1 represents the frequencies with which EV priority mode was prohibited due to low SOC control being executed when the vehicle 11 travelled toward ground point A (destination). Namely, the vehicle 11 has travelled the journey route RT1 and the journey route RT2 in the past. A route of the vehicle 11 with ignition switch switched ON departing from a departure ground point (first specific position) represented by symbol S in FIG. 5, and traveling via ground point P1, branch point SP1, branch point SP2, and ground point P2 to arrive at ground point A (second specific position) (destination) is called journey route RT1. Moreover after parking at ground point A, a route of the vehicle 11 departing ground point A (departure ground point) (first specific position) and traveling via ground point P3, ground point P4, to arrive at ground point B (second specific position) (destination) is called journey route RT2. In other words, a trip in which the vehicle 11 travels the journey route RT1 is the first trip, and a trip in which the vehicle 11 travels the journey route RT2 is the second trip. Moreover, when the vehicle 11 has arrived at discharge point P of journey route RT1 (start point of particular journey segment RS-A), and when the vehicle 11 has arrived at discharge point P of journey route RT2 (start point of particular journey segment RS-B) then based on information related to the discharge points P of the journey route RT1 and the journey route RT2 received from the external server 20, the low SOC control section 123 executes low SOC control to set the target SOC of the battery 17 to the particular target SOC (a). When the vehicle 11 travels the journey route RT1, the low SOC control is continued until the vehicle 11 arrives at ground point A, and when the vehicle 11 travels the journey route RT2, the low SOC control is continued until the vehicle 11 arrives at ground point B.

For example, consider a case in which the vehicle 11 travels the journey route RT1 in a time band of from 5:00 to 11:00 on a given Friday (weekday), and the vehicle 11 travels the journey route RT2 in a time band of from 11:00 to 14:00 the next day Saturday (holiday).

Consider a case in which execution of EV priority mode is prohibited when the vehicle 11 traveling the journey route RT1 passes ground point P1 and ground point P2, and when the vehicle 11 traveling the journey route RT2 passes ground point P3 and ground point P4. Note that the symbol X in FIG. 5 represents that the execution of EV priority mode was prohibited. The vehicle 11 passes the ground point P1 prior to arriving at the particular journey segment RS-A. There is accordingly no association between the low SOC control being executed in the particular journey segment RS-A and execution of EV priority mode being prohibited at ground point P1. For example, when a call to accelerate arises from the driver of the vehicle 11 depressing the accelerator pedal, then the drive source control section 122 may actuate the internal combustion engine 15 in addition to the electric motor 16 in order to satisfy the call for acceleration. In such cases the execution of EV priority mode is prohibited at ground point P1. There is a high correlation between the execution of EV priority mode being prohibited when the vehicle 11 passes the ground point P2 included in the particular journey segment RS-A and the low SOC control being performed in the particular journey segment RS-A.

When the vehicle 11 has arrived at the ground point A and the ignition switch 35 has been switched OFF, the communication I/F 12E wirelessly transmits journey history related to this first trip to the external server 20. As stated above, there is a high correlation between the execution of EV priority mode being prohibited when the vehicle 11 passes the ground point P2 and the low SOC control being executed in the particular journey segment RS-A. The map production section 213 of the external server 20 accordingly updates the map MP1 recorded in the ROM 20B so as to add "1" prohibition point to the prohibition count for the time band of from 5:00 to 11:00 on a weekday.

Furthermore, consider a case in which the ignition switch 35 is switched ON after the vehicle 11 has parked at ground point A, and the vehicle 11 departs from ground point A (departure ground point) and travels on journey route RT2. The time when low SOC control ended when the vehicle 11 was at ground point A is called t1, and the time when the vehicle 11 passed ground point P3 is called t2. The following is an example of a case in which a value (time) calculated by subtracting a parking duration from the time between a first time point (t1) when low SOC control ended and a second time point (t2) when the vehicle 11 with the ignition switch 35 in the ON position is positioned at a specific position, is called the journey elapse time. Namely, the journey elapse time is substantially the same as the time the vehicle 11 took to travel between the first time point and the second time point. Note that if the vehicle 11 does not park then the parking duration is zero. Furthermore, suppose that the length of the journey elapse time, which is the time between the time t1 and the time t2, is a second threshold or lower. The second threshold is, for example, 10 minutes. The SOC of the battery 17 is a low value when the vehicle 11 departs from the ground point A due to the low SOC control being executed in the first trip. Namely, there is a high correlation between the execution of EV priority mode being prohibited when the vehicle 11 passes the ground point P3, and the low SOC control being executed in the particular journey segment RS-A. Furthermore, a time when the vehicle 11 passed ground point P4 is called t3. The length of the journey elapse time between the time t1 and the time t3 is longer than the second threshold. There is a possibility that the SOC of the battery 17 reaches a high value during the journey elapse time when the journey elapse time is longer than the second threshold. This means that there is only a low correlation between execution of EV priority mode being prohibited when the vehicle 11 passes the ground point P4, and the low SOC control being executed in the particular journey segment RS-A.

When the vehicle 11 has arrived at ground point B and the ignition switch 35 has been switched OFF, the communication I/F 12E wirelessly transmits the journey history related to this second trip to the external server 20. As described above, there is a high correlation between the execution of EV priority mode being prohibited when the vehicle 11 passes the ground point P3, and the low SOC control being executed in the particular journey segment RS-A. The map production section 213 of the external server 20 accordingly updates the map MP1 recorded in the ROM 20B by adding "1" prohibition point to the prohibition count for the time band of from 5:00 to 11:00 on a weekday.

The map MP1 of FIG. 6 illustrates a case in which the vehicle 11 has travelled the particular journey segment RS-A a total of 56 times in the past. For example, execution of EV priority mode was prohibited in the vehicle 11 a total of four times in the time band between 5:00 and 11:00 on a weekday. Moreover, execution of EV priority mode was permitted in the vehicle 11 for a total of 46 times in the time band between 5:00 and 11:00 on a weekday. Namely, the map MP1 shows that execution of EV priority mode was prohibited 4 times from out of the 50 times that the vehicle 11 traveled in the time band between 5:00 and 11:00 on a weekday. Namely, the map MP1 shows that execution of EV priority mode was prohibited at a probability of 8% in the time band between 5:00 and 11:00 on a weekday. Namely, the prohibition frequency in the time band between 5:00 and 11:00 on a weekday is 8%. Note that the probability that execution of EV priority mode is prohibited (prohibition frequency) is zero percent for other time bands.

Figure 5:
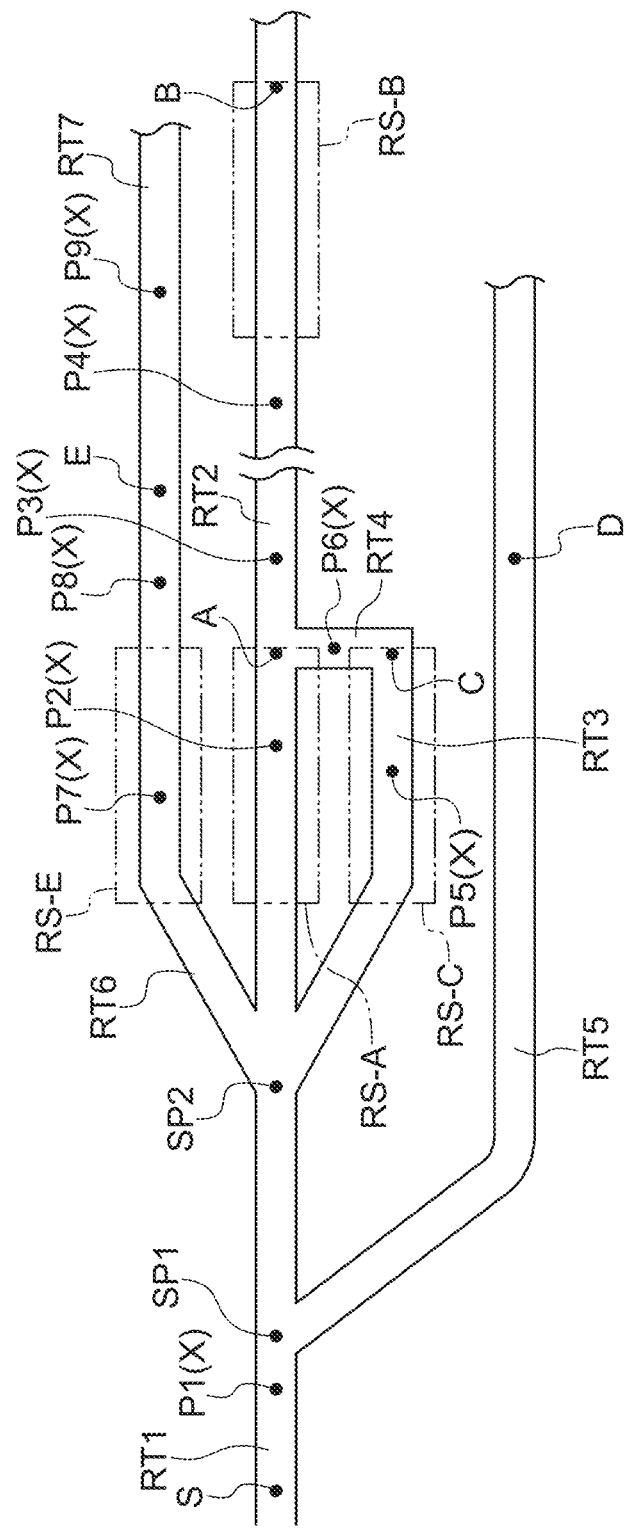
FIG. 5 is a schematic diagram illustrating roads that a vehicle travels along.

Next consider a case in which the vehicle 11 has not travelled in the past on either the journey route RT3 (first journey route) or on the journey route RT4 (second journey route) illustrated in FIG. 5, and the vehicle 11 is traveling on the journey route RT3 and the journey route RT4 for the first time. A route of the vehicle 11 with ignition switch switched ON departing from departure ground point S (first specific position) and traveling via ground point P1, branch point SP1, branch point SP2, and ground point P5 to arrive at ground point C (second specific position) (destination) is called journey route RT3. Moreover, a route of the vehicle 11 departing from ground point C (departure ground point) after parking at ground point C and traveling via ground point P6 to arrive at ground point A (destination) is called journey route RT4. In other words, a trip in which the vehicle 11 travels the journey route RT3 is the first trip and a trip in which the vehicle 11 travels the journey route RT4 is the second trip.

For example based on the journey history information and the like, the journey route prediction section 121 estimates that "the vehicle 11 is traveling along journey route RT1 toward ground point A" when the vehicle 11 traveling from departure ground point S toward ground point C has passed through ground point P1, branch point SP1 and branch point SP2. This means that when the vehicle 11 has arrived at a specific position (start point of particular journey segment RS-C) on the journey route RT3, the low SOC control section 123 executes low SOC control to set the target SOC of the battery 17 to the particular target SOC (a) based on the information related to the discharge point P of the journey route RT1 received from the external server 20. The low SOC control is continued until the vehicle 11 arrives at ground point C.

For example, suppose that the vehicle 11 travels the journey route RT3 in the time band of from 11:00 to 14:00 on a given Wednesday (weekday), and the vehicle 11 travels the journey route RT4 in the time band of from 14:00 to 20:00 on the same day.

Consider a case in which execution of EV priority mode was prohibited when the vehicle 11 traveling the journey route RT3 passed the ground point P1 and the ground point P5, and was also prohibited when the vehicle 11 traveling the journey route RT4 passed the ground point P6. Similarly to in the case of FIG. 6, there is no association between the low SOC control being executed in the particular journey segment RS-C and the execution of EV priority mode being prohibited at ground point P1. However, there is a high correlation between the execution of EV priority mode being prohibited when the vehicle 11 passed the ground point P5 contained in the particular journey segment RS-C and the low SOC control being executed in the particular journey segment RS-C.

When the vehicle 11 has arrived at ground point C and the ignition switch 35 has been switched OFF, the communication I/F 12E wirelessly transmits the journey history related to this first trip to the external server 20. The map production section 213 thereby produces the map MP2 illustrated in FIG. 7. The map MP2 shows the prohibition frequencies of EV priority mode caused by low SOC control being executed in the particular journey segment RS-C. In other words, the map MP2 represents the prohibition frequencies of EV priority mode caused by the low SOC control being executed when the vehicle 11 travels toward the ground point C (destination). Furthermore, as stated above, there is a high correlation between the execution of EV priority mode being prohibited when the vehicle 11 passes the ground point P5 contained in the particular journey segment RS-C and the low SOC control being executed in the particular journey segment RS-C. The map production section 213 of the external server 20 accordingly produces the map MP2 so as to add "1" prohibition point to the prohibition count for the time band of from 11:00 to 14:00 on a weekday.

Furthermore, after the vehicle 11 has parked at ground point C, the ignition switch 35 is switched ON, and then the vehicle 11 departs from ground point C (departure ground point) and travels on journey route RT4. The time when the vehicle 11 departed ground point C is called t4, and the time when the vehicle 11 has passed the ground point P6 is called t5. Furthermore, consider a case in which the length of the journey elapse time between the time t4 and the time t5 is not longer than the second threshold. The SOC of the battery 17 when the vehicle 11 departed from the ground point C has fallen to a low value due to the low SOC control being executed in the first trip. Namely, there is a high correlation between the execution of EV priority mode being prohibited when the vehicle 11 passes the ground point P6 and the low SOC control being executed in the particular journey segment RS-C.

When the vehicle 11 has arrived at ground point A and the ignition switch 35 has been switched OFF, the communication I/F 12E wirelessly transmits the journey history related to this second trip to the external server 20. The map production section 213 accordingly produces a map (omitted in the drawings) representing the journey history of the journey route RT4. Furthermore as described above, there is a high correlation between the execution of EV priority mode being prohibited when the vehicle 11 passed the ground point P6 and the low SOC control being executed in the particular journey segment RS-C. The map production section 213 of the external server 20 accordingly updates the map MP2 so as to add "1" prohibition point to the prohibition count for the time band of from 11:00 to 14:00 on a weekday. Note that the map MP2 illustrated in FIG. 7 is a subsequent map after the vehicle 11 has then travelled the journey route RT3 and the journey route RT4 plural times.

Description continues regarding a case in which the vehicle 11 travels the journey route RT5 illustrated in FIG. 5. Note that the vehicle 11 has already travelled on the journey route RT5 in the past. A route of the vehicle 11 for which the ignition switch 35 is switched ON departing from departure ground point S, and traveling via ground point P1 and branch point SP1 to arrive at ground point D (destination) is called journey route RT5. Low SOC control is not executed on this trip.

When the vehicle 11 has arrived at the ground point D and the ignition switch 35 has been switched OFF, the communication I/F 12E wirelessly transmits journey history related to this trip to the external server 20. In this case execution of EV priority mode was prohibited when the vehicle 11 passed the ground point P1. However, low SOC control was not executed on this trip. This means that in this case the map production section 213 does not add a prohibition point to the prohibition count when updating a map (omitted in the drawings) representing the journey history of the journey route RT5 as recorded in the ROM 20B.

Next consider a case in which the vehicle 11 has not travelled in the past either on journey route RT6 (first journey route) or on journey route RT7 (second journey route) illustrated in FIG. 5, and the vehicle 11 travels on the journey route RT6 and the journey route RT7 for the first time. A route in which the vehicle 11 for which the ignition switch has been switched ON departs the departure ground point S (first specific position), travels via ground point P1, branch point SP1, branch point SP2, ground point P7, and ground point P8 to arrive at ground point E (destination) is called journey route RT6. Moreover, a route in which, after parking at ground point E, the vehicle 11 departs ground point E (departure ground point) and travels out through ground point P9 is called journey route RT7. In other words, a trip in which the vehicle 11 travels the journey route RT6 is the first trip, and a trip in which the vehicle 11 travels the journey route RT7 is the second trip.

For example based on the journey history information and the like, the journey route prediction section 121 might estimate that "the vehicle 11 is traveling along journey route RT1 toward ground point A" when the vehicle 11 has passed ground point P1, branch point SP1, and branch point SP2 on the way from departure ground point S toward ground point E. In such cases, when the vehicle 11 has arrived at a specific position of the journey route RT6 (the start point of particular journey segment RS-E), the low SOC control section 123 executes low SOC control to set the target SOC of the battery 17 to particular target SOC (a) based on the information related to the discharge point P of the journey route RT1 received from the external server 20. Moreover, in such cases, the low SOC control is ended when the vehicle 11 has travelled a specific distance after passing the discharge point P. Namely, the low SOC control is ended when the vehicle 11 has arrived at the predicted destination (second specific position) predicted by the journey route prediction section 121. As illustrated in FIG. 5, the ground point E is separated from the ground point where the low SOC control was ended.

For example, suppose the vehicle 11 travels the journey route RT6 in a time band of from 11:00 to 14:00 on a given Saturday (holiday), and then the vehicle 11 travels the journey route RT7 in a time band of from 11:00 to 14:00 on a Monday two days later (a weekday).

Consider a case in which execution of EV priority mode is prohibited when the vehicle 11 travelling on the journey route RT6 travels to ground point P1, ground point P7, and ground point P8, and also when the vehicle 11 traveling on the journey route RT7 passes ground point P9. Similarly to the case in FIG. 6, there is no association between low SOC control being executed in particular journey segment RS-E and execution of EV priority mode being prohibited at ground point P1. There is, however, a high correlation between the execution of EV priority mode being prohibited when the vehicle 11 passes the ground point P7 contained in the particular journey segment RS-E and the low SOC control being executed in the particular journey segment RS-E.

Moreover, a time when the low SOC control is ended for the vehicle 11 traveling on the journey route RT6 is called t6, and the time when the vehicle 11 has passed ground point P8 is called t7. Suppose that the length of the journey elapse time between time t6 and time t7 is the second threshold or lower. The SOC of the battery 17 will have fallen to a low value when the low SOC control was ended in the first trip. Namely, there is a high correlation between execution of EV priority mode being prohibited when the vehicle 11 passes ground point P8 and low SOC control being executed in the particular journey segment RS-E.

When the vehicle 11 has arrived at ground point E and the ignition switch 35 has been switched OFF, the communication I/F 12E wirelessly transmits the journey history related to this first trip to the external server 20. As stated above, there is a high correlation between the execution of EV priority mode being prohibited when the vehicle 11 has passed the ground point P7 contained in the particular journey segment RS-E and low SOC control being executed in the particular journey segment RS-E, and there is also a high correlation between the execution of EV priority mode being prohibited when the vehicle 11 has passed the ground point P8 and low SOC control being executed in the particular journey segment RS-E. The map MP3 of FIG. 8 shows the prohibition frequencies of EV priority mode caused by low SOC control being executed in the particular journey segment RS-E. In other words, the map MP3 represents the prohibition frequencies of EV priority mode caused by the low SOC control being executed when the vehicle 11 travels toward the ground point E (destination). The map production section 213 of the external server 20 accordingly updates the map MP3 recorded on the ROM 20B so as to add "2" prohibition points to the prohibition count for the time band of from 11:00 to 14:00 on a holiday.

Furthermore, consider a case in which the after the vehicle 11 has parked at ground point E, the ignition switch 35 is switched ON and the vehicle 11 departs ground point E and travels along the journey route RT7. The time when the vehicle 11 has passed the ground point P9 is called t8. Furthermore, suppose that the length of the journey elapse time, which is a time calculated by subtracting the parking duration at ground point E from the time between t6, which is when low SOC control ended for the vehicle 11 traveling on the journey route RT6, and 18 is the second threshold or lower. The SOC of the battery 17 falls to a low value at time t6 when the low SOC control ended in the first trip. Namely, there is a high correlation between the execution of EV priority mode being prohibited when the vehicle 11 has passed the ground point P9 and low SOC control being executed in the particular journey segment RS-E.

When the vehicle 11 has arrived at the destination (omitted in the drawings) of the journey route RT7 and the ignition switch 35 has been switched OFF, the communication I/F 12E wirelessly transmits the journey history related to this second trip to the external server 20. The map production section 213 produces a map (omitted in the drawings) representing the journey history of the journey route RT7. Furthermore as stated above, there is a high correlation between the execution of EV priority mode being prohibited when the vehicle 11 has passed the ground point P9 and low SOC control being executed in the particular journey segment RS-E. The map production section 213 of the external server 20 accordingly updates the map MP3 recorded on the ROM 20B so as to add "1" prohibition point to the prohibition count for the time band of from 11:00 to 14:00 on a holiday.

The communication control section 214 controls the wireless communication device 21.

Operation and Advantageous Effects

Next, description follows regarding the operation and advantageous effects of the first exemplary embodiment.

Figure 10:
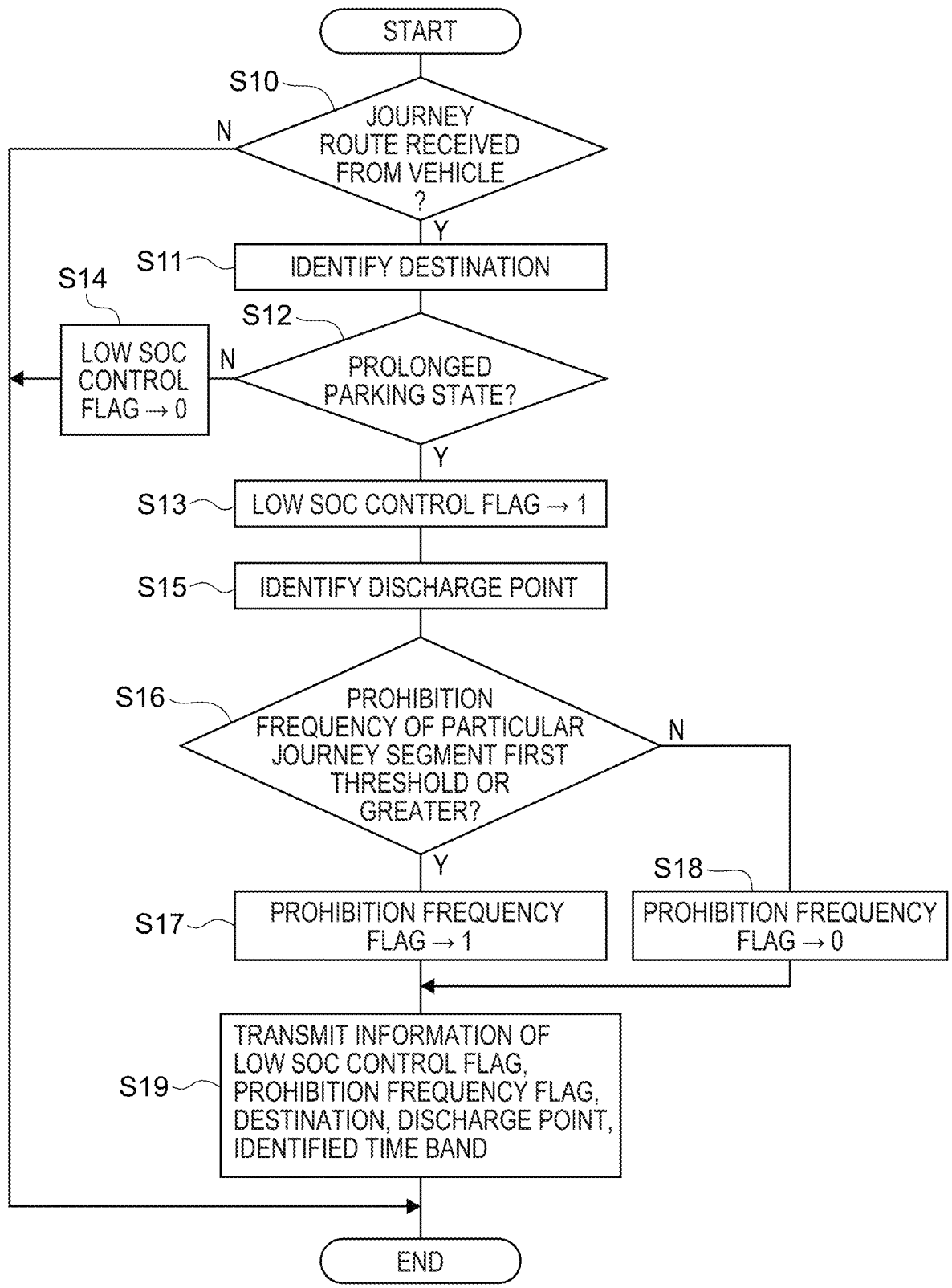
FIG. 10 is a flowchart illustrating processing executed by an external server.
Figure 11:
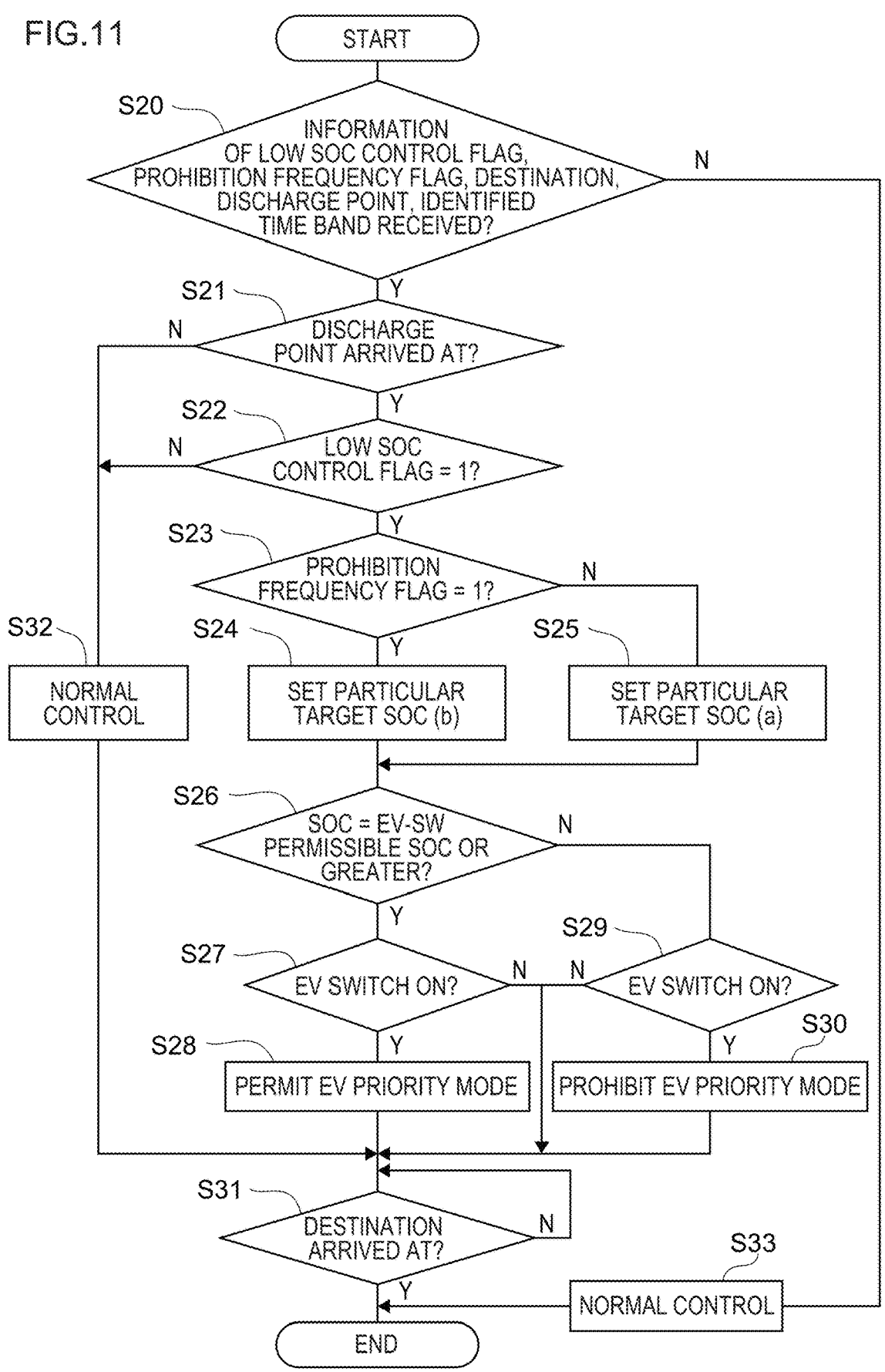
FIG. 11 is a flowchart illustrating processing executed by an ECU.
Figure 12:
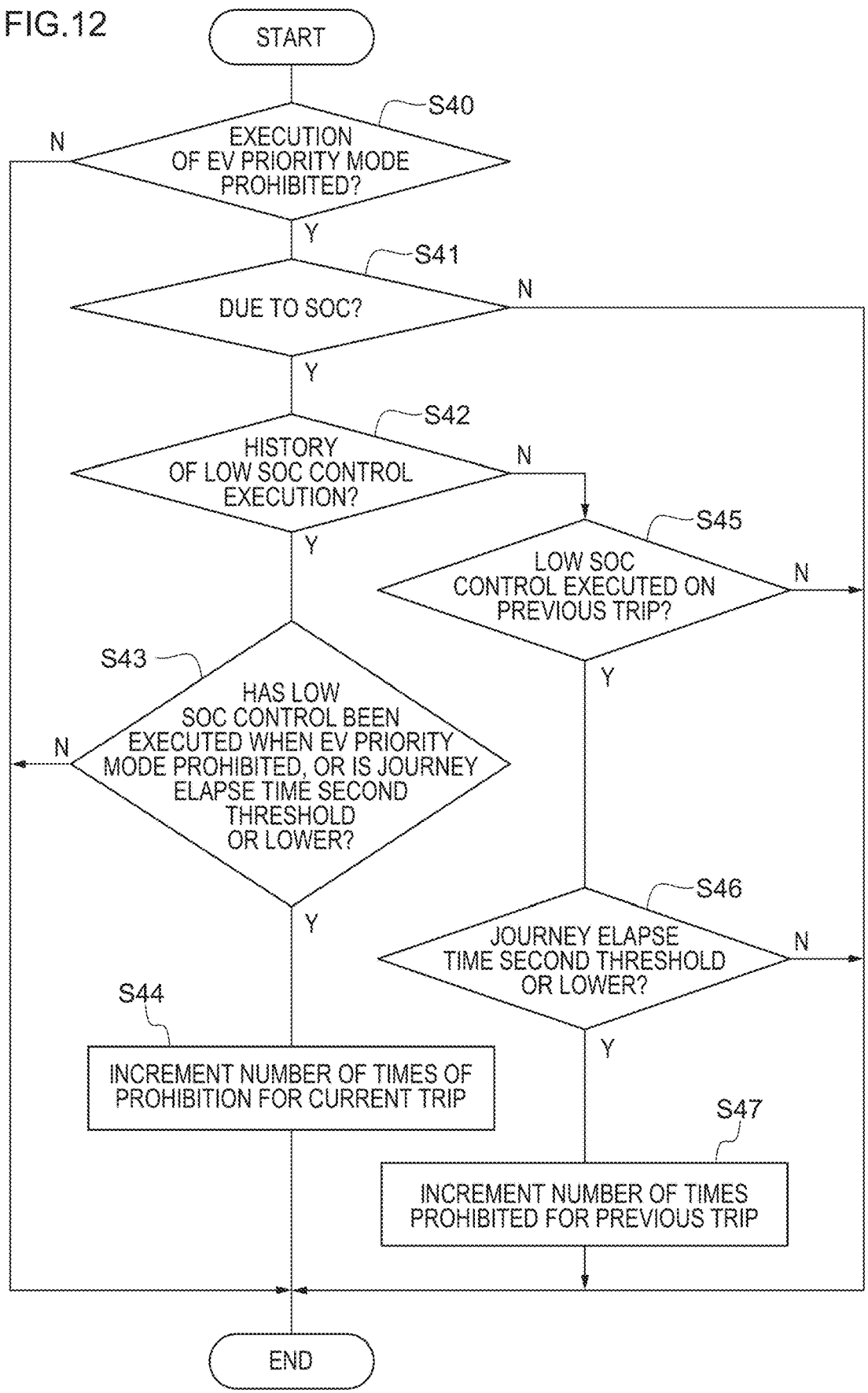
FIG. 12 is a flowchart illustrating processing executed by an ECU.

Description follows regarding operation of the ECU 12 of the vehicle 11 and the external server 20 in an embodiment as illustrated in FIG. 9 in which the vehicle 11 travels on one of the journey routes RT1, RT2, RT3 predicted by the journey route prediction section 121, with reference to flowcharts of FIG. 10 to FIG. 12. Note that in the following description the journey routes RT1, RT2, RT3 will be collectively called journey route RT, and the particular journey segments RS-A, RS-B, RS-C will be collectively called particular journey segment RS. The vehicle 11 departs the start ground point S (first specific position) of the journey route RT at time TM0 of FIG. 9. The vehicle 11 passes discharge point P at time TM1. Furthermore, the vehicle 11 arrives at destination G (ground points A, B, C) (second specific position) at time TM2. As illustrated in FIG. 9, the target SOC of the battery 17 is set to the normal target SOC between time TM0 and time TM1. Namely, normal control is performed by the drive source control section 122 on the vehicle 11 in this time band.

First description follows regarding processing of the flowchart of FIG. 10. The external server 20 (CPU thereof) executes the processing illustrated in the flowchart of FIG. 10 repeatedly each time a specific period of time has elapsed.

At step S10 ("step" will be omitted hereafter), the external server 20 determines whether or not information related to the journey route of the vehicle 11 predicted by the journey route prediction section 121 has been received from the vehicle 11.

The external server 20 proceeds to S11 when YES was determined at S10, and the parking determination section 211 predicts the destination G of the journey route RT of the vehicle 11 based on the predicted journey route, current date and time, weather information, and journey history information.

The external server 20 proceeds to S12 when the processing of S11 is finished, and the parking determination section 211 determines whether or not the vehicle 11 will be at the destination G in a prolonged parking state.

The external server 20 proceeds to S13 when YES was determined at S12, and the parking determination section 211 sets a value of a low SOC control flag to "1". Note that the initial value of the low SOC control flag is "0".

However, the external server 20 proceeds to S14 when NO has been determined at S12, and the parking determination section 211 sets the value of the low SOC control flag to "0".

The external server 20 proceeds to S15 when the processing of S13 is finished, and the parking determination section 211 decides a discharge point P.

The external server 20 proceeds to S16 when the processing of S15 is finished, and the frequency determination section 212 computes a prohibition frequency of execution of EV priority mode being prohibited when the vehicle 11 travelled the particular journey segment RS between destination G and the discharge point P in the past. Furthermore, the frequency determination section 212 also determines whether or not the prohibition frequency that was derived is a specific first threshold or greater. The first threshold in the present exemplary embodiment is 5%. However, the first threshold may be another value. For example, in cases in which the vehicle 11 is traveling on the journey route RT1 and the current time is included in a time band of from 5:00 to 11:00 on a weekday, the frequency determination section 212 determines YES at S16 and processing proceeds to S17.

The frequency determination section 212 of the external server 20 that has proceeded to S17 then sets the value of the prohibition frequency flag to "1". Note that an initial value of the prohibition frequency flag is "0".

Note that the external server 20 proceeds to S18 when NO has been determined at S16, and the frequency determination section 212 sets the value of the prohibition frequency flag to "0".

The external server 20 proceeds to S19 after the processing of S17 or S18 has finished. At S19, the wireless communication device 21 controlled by the communication control section 214 wirelessly transmits information that is information related to the low SOC control flag, the prohibition frequency flag, the predicted destination, the discharge point P, and the particular time band that is a time band when the prohibition frequency is determined to be the first threshold or greater to the vehicle 11 (the communication I/F 12E).

When NO has been determined at S10 or when the processing of S14 or S19 has finished, the external server 20 temporarily stops the processing of the flowchart of FIG. 10.

Next, description follows regarding the processing of the flowchart of FIG. 11 performed by the ECU 12 of the vehicle 11. The ECU 12 executes the processing of the flowchart of FIG. 11 repeatedly each time a specific period of time has elapsed.

First at S20, the low SOC control section 123 of the ECU 12 determines whether or not the information related to the low SOC control flag, the prohibition frequency flag, the predicted destination, the discharge point P, and the particular time band has been received by the communication I/F 12E and this information has been recorded in the storage 12D.

The low SOC control section 123 of the ECU 12 proceeds to S21 when YES was determined at S20, and based on information from the car navigation system and location information received by the GNSS receiver 14, the low SOC control section 123 determines whether or not the vehicle 11 has arrived at a discharge point P. For example, the ECU 12 determines YES at S21 and proceeds to S22 when the current time is TM1 of FIG. 9. However, the ECU 12 determines NO at S21 when the current time is a time prior to TM1.

At S22 the low SOC control section 123 determines whether or not the value of the low SOC control flag is "1".

The ECU 12 proceeds to S23 when YES was determined at S22, and the low SOC control section 123 determines whether or not the value of the prohibition frequency flag is "1" and whether or not the current time is contained in a particular time band.

The ECU 12 proceeds to S24 when YES was determined at S23, and the low SOC control section 123 sets the target SOC of the battery 17 to the particular target SOC (b). However, the ECU 12 proceeds to S25 when NO has been determined at S23, and the low SOC control section 123 sets the target SOC of the battery 17 to the particular target SOC (a). For example, the low SOC control section 123 executes low SOC control by the ECU 12 performing the processing of S24 or S25 at the time TM1 of FIG. 9. As illustrated in FIG. 9, the low SOC control section 123 executes the low SOC control between time TM1 and time TM2. In cases in which the ECU 12 performs the processing of S24, as illustrated by the solid line in FIG. 9, the value of the SOC, which was at a value close to the normal target SOC at time TM1, decreases with the elapse of time, and has a magnitude close to the particular target SOC (b) at time TM2. However, in cases in which the ECU 12 performs the processing of S25 as illustrated by the double-dot broken line in FIG. 9, the value of the SOC, which was at a value close to the normal target SOC at time TM1, decreases with the elapse of time, and has a magnitude close to the particular target SOC (a) at time TM2.

The ECU 12 proceeds to S26 when the processing of S24 or S25 has finished, and the determines whether or not the SOC of the battery 17 is the EV-SW permissible SOC or greater.

For example, in cases in which the ECU 12 has performed the processing of S24, as is clear from FIG. 9, the SOC of the battery 17 is a value of the EV-SW permissible SOC or greater between time TM1 and time TM2. The ECU 12 accordingly determines YES at S26 in this case and proceeds to S27.

At S27 the drive source control section 122 of the ECU 12 determines whether or not the EV switch 18 is positioned in the ON position. The drive source control section 122 proceeds to S28 when YES has been determined at S27. In such cases, as stated above the SOC of the battery 17 is a value of the EV-SW permissible SOC or greater, and so at S28 the drive source control section 122 permits the travel mode of the vehicle 11 to become the EV priority mode (see the solid line in FIG. 9).

However in cases in which the ECU 12 has performed the processing of S25, as is apparent from the example of FIG. 9 for example, the SOC of the battery 17 becomes a value less than the EV-SW permissible SOC between time TM1$a$ and time TM2. Note that time TM1$a$ is a time between time TM1 and time TM2. The ECU 12 accordingly determined NO at S26 at time TM1$a$ for example and proceeds to S29.

At S29, the drive source control section 122 of the ECU 12 determines whether or not the EV switch 18 is positioned in the ON position. The drive source control section 122 proceeds to S30 when YES has been determined at S29. In such cases, as stated above the SOC of the battery 17 is a value of less than the EV-SW permissible SOC. Accordingly when the ECU 12 performs the processing of S30 at for example time TM1$a$, the drive source control section 122 prohibits the travel mode of the vehicle 11 from becoming the EV priority mode (see the double-dot broken line in FIG. 9). Content that the EV priority mode has been prohibited is displayed on the display 19.

The ECU 12 proceeds to S31 after the processing of S28 or S30 has finished, and based on the location information received by the GNSS receiver 14, determination is made as to whether or not the vehicle 11 has arrived at the destination G.

Moreover, the ECU 12 proceeds to S32 when NO has been determined at S21 or S22, and the drive source control section 122 executes normal control. Namely, in this case the drive source control section 122 executes normal control while the vehicle 11 is traveling from the start ground point S to the destination G. The ECU 12 proceeds to S33 when NO has been determined at S20, and the drive source control section 122 executes normal control.

When YES has been determined at S31 or the processing of S33 has finished, the ECU 12 temporarily stops the processing of the flowchart of FIG. 11.

Next, description follows regarding the processing of the flowchart of FIG. 12 performed by the ECU 12. The ECU 12 executes the processing of the flowchart of FIG. 12 each time the ignition switch 35 is switched OFF.

First at S40, the ECU 12 determines whether or not the execution of EV priority mode has been prohibited for the current trip that is the trip when the ignition switch 35 was switched OFF.

The ECU 12 proceeds to S41 when YES has been determined at S40, and determination is made as to whether or not the reason that execution of EV priority mode was prohibited was due to the SOC of the battery 17. For example, the ECU 12 determines YES at S41 in cases in which execution of EV priority mode has been prohibited due to execution of low SOC control. However, the ECU 12 determines NO at S41 in cases in which prohibition of execution of EV priority mode was due to a demand for acceleration, for example.

The ECU 12 proceeds to S42 when YES has been determined at S41, and determines whether or not there is a history of executing low SOC control. In other words, the ECU 12 determines whether or not the processing of S24 or S25 of FIG. 11 has been executed.

The ECU 12 proceeds to S43 when YES has been determined at S42, and determination is made as to whether or not the low SOC control was being executed when execution of EV priority mode was prohibited, or whether or not the journey elapse time when the execution of EV priority mode was prohibited was the second threshold or lower.

The ECU 12 proceeds to S44 when YES has been determined at S43, and the prohibition count for the current trip is incremented. Note that a particular condition is satisfied when YES has been determined at S43.

The ECU 12 proceeds to S45 when NO has been determined at S42, and determination is made as to whether or not SOC control was executed at a previous trip that is a trip immediately previous to the current trip. In other words, determination is made as to whether or not the processing of S24 or S25 of FIG. 11 was executed during the previous trip.

The ECU 12 proceeds to S46 when YES was determined at S45, and determination is made as to whether or not the journey elapse time when the execution of EV priority mode was prohibited is the second threshold or lower.

The ECU 12 proceeds to S47 when YES has been determined at S46 and the prohibition count for the previous trip is incremented. Note that a particular condition is satisfied when YES has been determined at S46.

The ECU 12 temporarily stops the processing of the flowchart of FIG. 12 when NO has been determined at S40, S41, S43, S45, or S46, or when the processing of S44 or S47 has finished.

In the vehicle control device 10 of the present exemplary embodiment as described above, the drive source control section 122 of the ECU 12 of the vehicle 11 controls for the EV priority mode prioritizing use of the electric motor 16 as the drive source of the vehicle 11 when the SOC of the battery 17 is not less than the EV-SW permissible SOC that is lower than the normal target SOC and the EV switch 18 has been switched ON. However, the drive source control section 122 prohibits the vehicle 11 from using the EV priority mode when the SOC is less than the EV-SW permissible SOC. Furthermore, when the parking determination section 211 of the external server 20 has determined that the vehicle 11 will be in a prolonged parking state, the low SOC control section 123 of the ECU 12 executes low SOC control to set the particular target SOC, which is the target SOC for when the vehicle 11 travels in the particular journey segment RS, to a value lower than the normal target SOC. Furthermore, when the vehicle 11 has travelled in the particular journey segment RS in the past with a target SOC at value (particular target SOC (a)) lower than the EV-SW permissible SOC, the frequency determination section 212 determines whether or not the prohibition frequency of the drive source control section 122 prohibiting the vehicle 11 from entering the EV priority mode is the first threshold or greater. Furthermore, when the frequency determination section 212 has determined that the prohibition frequency is the first threshold or greater and the vehicle 11 is travelling in the particular journey segment RS, the low SOC control section 123 adjusts the particular target SOC such that the particular target SOC becomes a value (particular target SOC (b)) of the EV-SW permissible SOC or greater.

Figure 13:
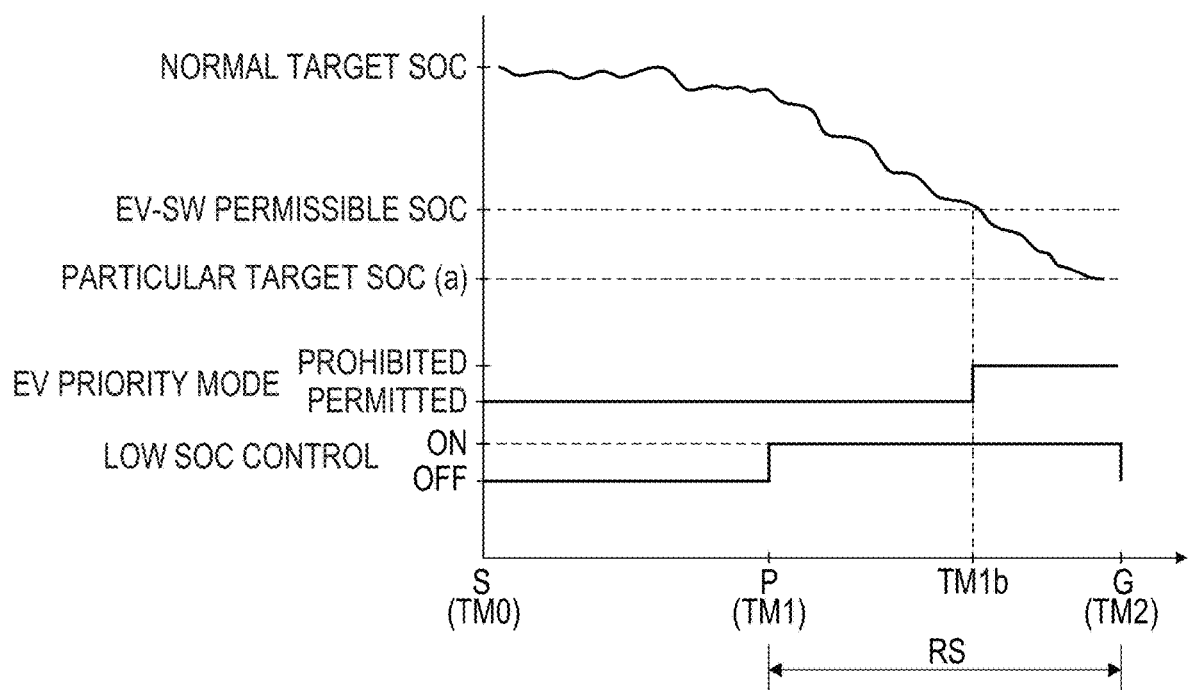
FIG. 13 is a timing chart respectively illustrating states of SOC, EV priority mode, and low SOC control when a vehicle of a comparative example has travelled in a particular journey segment.

Consider a case in which the target SOC is the particular target SOC (a) that is lower than the EV-SW permissible SOC and the prohibition frequency when the vehicle 11 having the EV switch 18 that has been switched ON by the driver had traveled in the particular journey segment RS in the past is the first threshold or greater. A comparative example illustrated in FIG. 13 is an example of a case in which the vehicle 11 has traveled in the particular journey segment RS in such a state in the past, and then a few days later the vehicle 11 has traveled in the particular journey segment RS in a state in which the target SOC is the particular target SOC (a). In the comparative example, the SOC of the vehicle 11 while travelling in the particular journey segment RS is likely to become lower than the EV-SW permissible SOC between time TM1$b$ and time TM2. Namely, there is a high possibility that the drive source control section 122 executes processing to prohibit the EV priority mode while the vehicle 11 is traveling once along the particular journey segment RS.

In contrast thereto, in the present exemplary embodiment, when the vehicle 11 is travelling in the particular journey segment RS, the low SOC control section 123 sets the value of the target SOC (the particular target SOC (b)) such that the SOC of the battery 17 is a value of the EV-SW permissible SOC or higher. In such cases, the vehicle 11 is less likely to be prohibited from entering the EV priority mode than in the comparative example, even when the vehicle 11 is traveling in the particular journey segment RS while low SOC control is being executed. Namely, the vehicle 11 is not likely to be impeded from traveling in the EV priority mode while being able to execute low SOC control.

Furthermore, in cases in which the target SOC of the battery 17 is set to the particular target SOC (b) by the low SOC control, there is a low possibility that the SOC will become an excessively low value. This means that there is less concern regarding deterioration of the battery 17.

Furthermore, consider a case in which the target SOC is the particular target SOC (a) lower than the EV-SW permissible SOC and the prohibition frequency when the vehicle 11 with the EV switch 18 switched ON by the driver travelled the particular journey segment RS in the past is less than the first threshold. In such cases, in a subsequent state in which the target SOC is the particular target SOC (a) when the vehicle 11 has traveled in the particular journey segment RS, the SOC of the vehicle 11 is likely to be maintained at the EV-SW permissible SOC or greater while travelling in the particular journey segment RS. Namely, there is a low possibility that the drive source control section 122 will execute processing to prohibit the EV priority mode while the vehicle 11 is traveling once on the particular journey segment RS. Namely, the vehicle 11 unlikely to be prohibited from entering the EV priority mode even when the vehicle 11 executing low SOC control is traveling in the particular journey segment RS in a state in which the target SOC is set at the particular target SOC (a) lower than the EV-SW permissible SOC.

Furthermore, by the target SOC being set by the low SOC control to the particular target SOC (a), as illustrated in FIG. 9, the SOC of the battery 17 becomes a magnitude close to the particular target SOC (a) when the vehicle 11 has arrived at the destination G. Then after the vehicle 11 has been in a prolonged parking state at the destination G and the ignition switch of the vehicle 11 has been switched ON by the driver, the internal combustion engine 15 is started and the vehicle 11 enters a warm-up operation state. The electric motor 16 is operated as a generator during the warm-up operation, and the electrical power generated by the electric motor 16 is stored in the battery 17. In such cases the SOC of the battery 17 becomes a low value close to the particular target SOC (a) at the point in time when the ignition switch was switched ON. Accordingly when the vehicle 11 performs the warm-up operation in this state, a large quantity of electrical power generated by the electric motor 16 is stored in the battery 17. This means that the fuel economy of the vehicle 11 is likely to be improved in cases in which the SOC of the battery 17 reaches a magnitude close to the particular target SOC (a) when the vehicle 11 has arrived at the destination G.

The more accurately the prohibition frequency derived as described above expresses an association between the execution of low SOC control and the vehicle 11 being prohibited from entering the EV priority mode, the less likely the vehicle 11 is to be impeded from traveling in EV priority mode when the low SOC control has been executed.

In the present exemplary embodiment, for example in a case in which the low SOC control has continued until the vehicle 11 has arrived at the ground point A that is the destination (second specific position) of the journey route RT1 (first journey route), a prohibition point related to the journey route RT2 is recorded in the map MP1 when the journey elapse time, as calculated between the time when the vehicle 11 departed the ground point A and the time when the vehicle 11 was prohibited from entering EV priority mode during travel on the journey route RT2 (second journey route), is the second threshold or lower.

Moreover for example, in cases in which the low SOC control is ended when the vehicle 11 has arrived at a ground point (second specific position) ahead of the ground point E that is the destination of the journey route RT6 (first journey route), the prohibition point related to the journey route RT6 is recorded in the map MP3 when the journey elapse time, as calculated between the time when the low SOC control was ended, and the time when the vehicle 11 was prohibited from entering EV priority mode while traveling in an region (ground point P8) between the position of the vehicle 11 when the low SOC control was ended and the ground point E, is the second threshold or lower.

Moreover for example, in cases in which the low SOC control ended when the vehicle 11 arrived at the ground point (second specific position) ahead of the ground point E that is destination of the journey route RT6 (first journey route), a prohibition point related to the journey route RT7 is recorded in the map MP3 when the journey elapse time, which is a value calculated by subtracting the duration the vehicle 11 parked at the ground point E from the time between a first time when the low SOC control finished and the second time when the vehicle 11 was prohibited from entering EV priority mode while traveling in a specific position region (ground point P9) after departing from the ground point E, is the second threshold or lower.

Thus the prohibition frequency in the present exemplary embodiment accordingly accurately expresses an association between execution of low SOC control and the vehicle 11 being prohibited from entering EV priority mode. The present exemplary embodiment accordingly enables the vehicle 11 capable of executing low SOC control to be made less likely to be impeded from traveling in EV priority mode than in cases in which no consideration is given to the association between the execution of low SOC control and the vehicle 11 being prohibited from entering EV priority mode. Namely, execution of EV priority mode is not likely to be impeded when the vehicle 11 travels to the ground points P2, P5, P7 while executing low SOC control, and when the vehicle 11 travels to the ground points P3, P4, P6, P8, P9 while not executing low SOC control.

Explanation follows regarding a second exemplary embodiment of the vehicle control device 10 according to the present disclosure. Note that description related to technical content common to that of the first exemplary embodiment will be omitted.

In the second exemplary embodiment, a determination is made as to whether or not a distance between a position of the vehicle 11 when the low SOC control ended and the position of the vehicle 11 when entry to EV priority mode was prohibited is a third threshold or lower. There is conceivably a high correlation between the execution of low SOC control and the vehicle 11 being prohibited from entering EV priority mode in cases in which the vehicle 11 has travelled a short distance of the third threshold or lower from when low SOC control ended. However, there is conceivably a low correlation between the execution of low SOC control and the vehicle 11 being prohibited from entering EV priority mode in cases in which the vehicle 11 has travelled a given distance from where low SOC control ended. The third threshold is, for example, 3 km. Moreover, a particular condition is satisfied when the distance between the position of the vehicle 11 and the position of the vehicle 11 when entering EV priority mode was prohibited is the third threshold or lower.

For example, consider a case in which the vehicle 11 travels along the journey route RT1 to the ground point A, and then after parking at the ground point A, has travelled along the journey route RT2 to the ground point B. In such a case a prohibition point is added to the prohibition count of the map MP1 when the execution of EV priority mode has been prohibited at ground point P3 and the distance between ground point A and the ground point P3 does not exceed the third threshold. Moreover, a prohibition point is not added to the prohibition count of the map MP1 when the execution of EV priority mode has been prohibited at ground point P4 and the distance between ground point A and the ground point P4 is longer than the third threshold.

According to the second exemplary embodiment, a prohibition point having only a small association with execution of low SOC control can be prevented from being recorded in the maps MP1, MP2, MP3. This means that in the second exemplary embodiment too, traveling in EV priority mode is unlikely to be impeded in the vehicle 11 capable of executing low SOC control.

Description continues regarding a third exemplary embodiment of the vehicle control device 10 according to the present disclosure. Note that description related to technical content common to that of the first exemplary embodiment will be omitted.

In the third exemplary embodiment, determination is made as to whether or not the vehicle 11 has entered the EV priority mode after the low SOC control ended and prior to the SOC of the battery 17 of the vehicle 11 subsequently traveling in a specific region becoming a magnitude of a specific fourth threshold or greater. It is thought that there is a high correlation between execution of low SOC control and the vehicle 11 being prohibited from entering the EV priority mode, prior to the elapse of a time at which the SOC of the battery 17 becomes a magnitude of the fourth threshold or greater after the low SOC control has ended. However, It is thought that there is a low correlation between execution of low SOC control and the vehicle 11 being prohibited from entering the EV priority mode, after the elapse of a time at which the SOC of the battery 17 becomes a magnitude of the fourth threshold or greater after the low SOC control has ended. The fourth threshold is a higher value than the EV-SW permissible SOC and is, for example, 50%. A particular condition is satisfied when the vehicle 11 has entered EV priority mode prior to the SOC reaching a magnitude of the fourth threshold or greater.

For example, consider a case in which the vehicle 11 travels along journey route RT1 to ground point A, and then after parking at ground point A the vehicle 11 has travelled along journey route RT2 to ground point B. In such cases, a prohibition point is added to the prohibition count of the map MP1 when, while the vehicle 11 is traveling between ground point A and ground point P3, the execution of EV priority mode has been prohibited at ground point P3 without the SOC of the battery 17 reaching the fourth threshold or greater. Moreover, a prohibition point is not added to the prohibition count of the map MP1 in a case in which the execution of EV priority mode has been prohibited at ground point P4 and the SOC of the battery 17 has reached the magnitude of the fourth threshold or greater when the vehicle 11 is traveling between ground point A and ground point P4.

In the third exemplary embodiment, a prohibition point having only a small association to execution of low SOC control can be prevented from being recorded in the maps MP1, MP2, MP3. This means that the third exemplary embodiment is also able to make it unlikely that the vehicle 11 capable of executing low SOC control will be impeded from traveling in EV priority mode.

Figure 14:
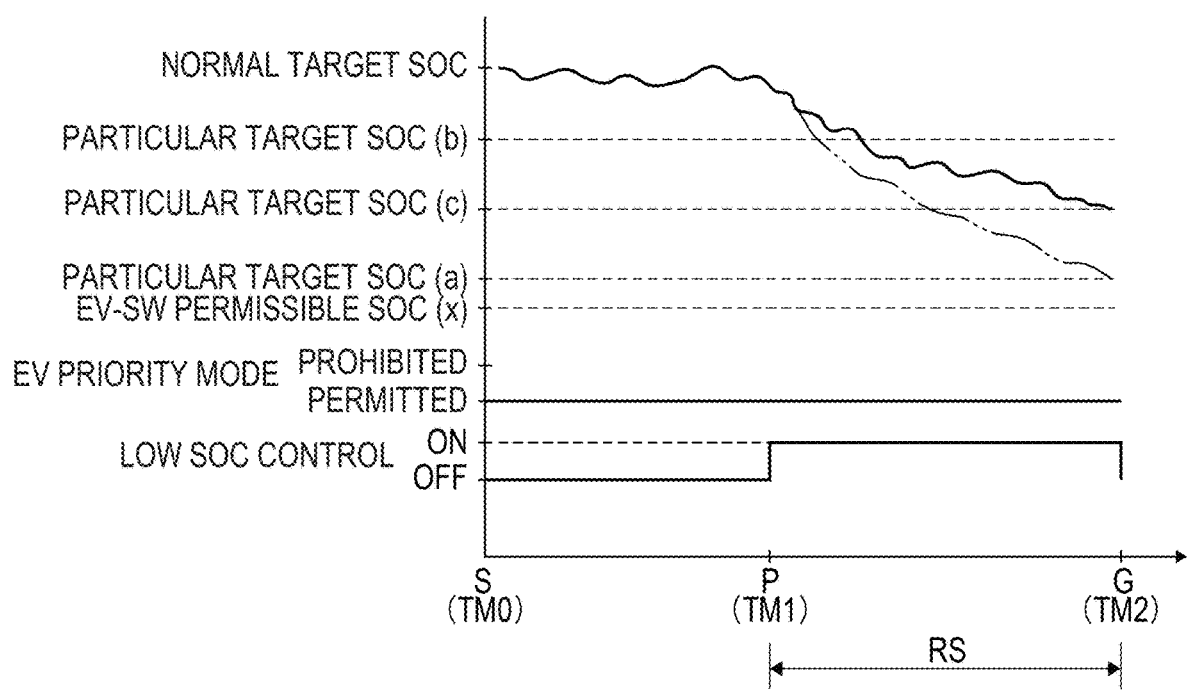
FIG. 14 is a timing chart respectively illustrating states of SOC, EV priority mode, and low SOC control when a vehicle of a fourth exemplary embodiment has travelled in a particular journey segment.

Description continues regarding a fourth exemplary embodiment of the vehicle control device 10 according to the present disclosure, with reference to FIG. 14 and FIG. 15. Note that description of technical content common to that of the first exemplary embodiment will be omitted.

A first feature of the fourth exemplary embodiment is a point that, when the low SOC control section 123 executes low SOC control and the frequency determination section 212 has determined that the prohibition frequency is the second threshold or greater, the low SOC control section 123 changes the EV-SW permissible SOC to a value lower than the EV-SW permissible SOC when the low SOC control section 123 does not execute low SOC control or when the frequency determination section 212 has determined that the prohibition frequency is less than the second threshold. As illustrated in FIG. 14, such a modified EV-SW permissible SOC (x) is a value lower than the particular target SOC (a), and is for example 41%. However, the EV-SW permissible SOC (x) may be a value of the particular target SOC (a) or greater as long as it is a value lower than a particular target SOC (c), described later.

A second feature of the fourth exemplary embodiment is a point that, when the low SOC control section 123 executes low SOC control and the frequency determination section 212 has determined that the prohibition frequency is the second threshold or greater, the low SOC control section 123 sets the particular target SOC to the particular target SOC (c) that is lower than the particular target SOC (b) and higher than the particular target SOC (a).

Operation and Advantageous Effects

Next, description follows regarding operation and advantageous effects of the fourth exemplary embodiment.

The external server 20 of the fourth exemplary embodiment also performs the processing of the flowchart of FIG. 10. However, the ECU 12 performs the processing of the flowcharts of FIG. 12 and FIG. 15. The flowchart of FIG. 15 differs from the flowchart of FIG. 11 merely in S23A, S24A.

At S23A, the low SOC control section 123 changes the EV-SW permissible SOC to the EV-SW permissible SOC (x).

The ECU 12 proceeds to S24A when the processing of S23A has finished, and the low SOC control section 123 sets the target SOC of the battery 17 to the particular target SOC (c). The low SOC control section 123 executes the low SOC control by the ECU 12 performing the processing of S24A, for example at time TM1 of FIG. 14. In cases in which the ECU 12 performs the processing of S24A, as illustrated by the solid line in FIG. 14, the SOC that was a value close to the normal target SOC at time TM1, decreases with the elapse of time, and becomes a magnitude close to the particular target SOC (c) at time TM2. However, in cases in which the ECU 12 performs the processing of S25, as illustrated by the double-dot broken line in FIG. 14, the SOC that was a value close to the normal target SOC at time TM1, decreases with the elapse of time, and becomes a magnitude close to the particular target SOC (a) at time TM2.

The ECU 12 proceeds to S26 when the processing of S24A or S25 is finished and determines whether or not the SOC of the battery 17 is the EV-SW permissible SOC or greater.

In the vehicle control device 10 of the fourth exemplary embodiment as described above, due to the low SOC control executed in cases in which YES has been determined at S22, the SOC of the battery 17 between time TM1 and time TM2 is liable to be a magnitude lower than the SOC of the battery 17 between time TM1 and time TM2 in the first exemplary embodiment. However in such a situation the EV-SW permissible SOC (x) is a value lower than the particular target SOC (c). This means that during execution of low SOC control in the vehicle 11, the vehicle 11 unlikely to be prohibited from entering EV priority mode even when traveling in the particular journey segment RS in a state in which the target SOC is set to the particular target SOC (c). Namely, the vehicle 11 is not likely to be impeded from travelling in the EV priority mode while still being capable of executing low SOC control.

Moreover, in the fourth exemplary embodiment, a value of the SOC of the battery 17 when the vehicle 11 has arrived at the destination G is likely to be smaller than a value of the SOC of the battery 17 when the vehicle 11 of the first exemplary embodiment has arrived at the destination G. The fourth exemplary embodiment is accordingly more likely to be able to improve the fuel economy of the vehicle 11 than in the first exemplary embodiment.

Although the vehicle control device 10, the vehicle control method, and the non-transitory storage medium according to the first to the fourth exemplary embodiments have been described above, appropriate design changes may be made to the vehicle control device 10 within a range not departing from the spirit of the present disclosure.

Although in the first to the fourth exemplary embodiments the external server 20 included functions of the parking determination section 211 and the frequency determination section 212, the ECU 12 may include the function of the parking determination section 211 or the frequency determination section 212, or both.

Although in the first to the fourth exemplary embodiments the ECU 12 included the function of the journey route prediction section 121, the external server 20 may include the function of the journey route prediction section 121. In such cases, information related to the journey route estimated by the journey route prediction section 121 of the external server 20 is wirelessly transmits from the external server 20 to the vehicle 11.

When low SOC control is executed, the low SOC control section 123 may adjust (change) at least one out of the particular target SOC or the EV-SW permissible SOC such that the particular target SOC and the EV-SW permissible SOC become the same value.

The second exemplary embodiment and the third exemplary embodiment may also be applied to the fourth exemplary embodiment.

What is claimed is:

1. A vehicle control device, comprising a processor, wherein the processor is configured to:
cause a vehicle to enter an electric vehicle (EV) priority mode in which an electric motor of a vehicle is prioritized for use as a drive source of the vehicle and an internal combustion engine is not used, when a state of charge (SOC) of a battery configured to supply electrical power to the electric motor is not less than an electric vehicle switch (EV-SW) permissible SOC that is lower than a normal target SOC and an EV switch has been switched ON;
prohibit the vehicle from entering the EV priority mode in a case in which the SOC is less than the EV-SW permissible SOC; and
execute low SOC control to set a particular target SOC, which is a target SOC for when the vehicle, which is traveling from a first specific position along a first journey route, arrives at a second specific position, to a value lower than the normal target SOC,
wherein the particular target SOC of the vehicle executing the low SOC control is equal to or greater than a value of the EV-SW permissible SOC in a case in which a prohibition frequency is a first threshold or greater, the prohibition frequency being derived based on a total value of prohibition points that represent the vehicle being prohibited from entering the EV priority mode as a result of the low SOC control.

2. The vehicle control device of claim 1, wherein the processor is configured to:
add a point to the prohibition points related to the first journey route in a case in which, in the vehicle travelling on the first journey route, the low SOC control is being executed and entry to the EV priority mode has been prohibited; and
in a case in which the vehicle is traveling on a second journey route starting from the second specific position without executing low SOC control after the vehicle has travelled the first journey route while the low SOC control was being executed, prohibit the vehicle traveling on the second journey route from entering the EV priority mode and add a point to the prohibition points related to the first journey route when a particular condition has been satisfied.

3. The vehicle control device of claim 2, wherein, in a case in which the low SOC control continues until the vehicle arrived at the second specific position, the particular condition is satisfied when a period of time is a second threshold or lower, the period of time being from a time at which the vehicle departed from the second specific position of the first journey route to a time at which the vehicle traveling on the second journey route was prohibited from entering the EV priority mode.

4. The vehicle control device of claim 2, wherein, in a case in which the low SOC control ends prior to the vehicle arriving at the second specific position, the particular condition is satisfied when a period of time is a second threshold or lower, the period of time being from a time at which the low SOC control ended to a time at which the vehicle was prohibited from entering EV priority mode while traveling in a region between a position of the vehicle when the low SOC control ended and the second specific position.

5. The vehicle control device of claim 2, wherein, in a case in which the low SOC control ends prior to the vehicle arriving at the second specific position, the particular condition is satisfied when a journey elapse time is a second threshold or lower, the journey elapse time being a value calculated by taking a period of time from a first time at which the low SOC control ended to a second time at which the vehicle traveling in a specific region of the second journey route was prohibited from entering the EV priority mode, and subtracting, from the period of time, a time during which the vehicle was parked between the first time and the second time.

6. The vehicle control device of claim 2, wherein the particular condition is satisfied when a distance is a third threshold or lower, the distance being from a position of the vehicle when the low SOC control ended to a position of the vehicle when the vehicle traveling on the second journey route was prohibited from entering the EV priority mode.

7. The vehicle control device of claim 2, wherein the particular condition is satisfied when the vehicle traveling on the second journey route has been prohibited from entering the EV priority mode after the low SOC control has ended and prior to the SOC of the battery of the vehicle traveling on the second journey route reaching a magnitude of a specific fourth threshold or greater.

8. A vehicle control method, comprising, by a processor:
causing a vehicle to enter an electric vehicle (EV) priority mode in which an electric motor of a vehicle is prioritized for use as a drive source of the vehicle and an internal combustion engine is not used, when an SOC of a battery configured to supply electrical power to the electric motor is not less than an electric vehicle switch (EV-SW) permissible SOC that is lower than a normal target SOC and an EV switch has been switched ON;
prohibiting the vehicle from entering the EV priority mode in a case in which the SOC is less than the EV-SW permissible SOC; and
executing low SOC control to set a particular target SOC, which is a target SOC for when the vehicle, which is traveling from a first specific position along a first journey route, arrives at a second specific position, to a value lower than the normal target SOC,
wherein the particular target SOC of the vehicle executing the low SOC control is equal to or greater than a value of the EV-SW permissible SOC in a case in which a prohibition frequency is a first threshold or greater, the prohibition frequency being derived based on a total value of prohibition points that represent the vehicle being prohibited from entering the EV priority mode as a result of the low SOC control.

9. A non-transitory storage medium storing a program executable by a computer to perform processing, the processing comprising:
causing a vehicle to enter an electric vehicle (EV) priority mode in which an electric motor of a vehicle is prioritized for use as a drive source of the vehicle and an internal combustion engine is not used, when an SOC of a battery configured to supply electrical power to the electric motor is not less than an electric vehicle switch (EV-SW) permissible SOC that is lower than a normal target SOC and an EV switch has been switched ON;
prohibiting the vehicle from entering the EV priority mode in a case in which the SOC is less than the EV-SW permissible SOC; and
executing low SOC control to set a particular target SOC, which is a target SOC for when the vehicle, which is traveling from a first specific position along a first journey route, arrives at a second specific position, to a value lower than the normal target SOC, wherein the particular target SOC of the vehicle executing the low SOC control is equal to or greater than a value of the EV-SW permissible SOC in a case in which a prohibition frequency is a first threshold or greater, the prohibition frequency being derived based on a total value of prohibition points that represent the vehicle being prohibited from entering the EV priority mode as a result of the low SOC control.

* * * * *